(12) United States Patent
McCoskey et al.

(10) Patent No.: US 7,275,715 B2
(45) Date of Patent: Oct. 2, 2007

(54) OPERATIONAL GROUND SUPPORT SYSTEM

(75) Inventors: William R. McCoskey, Bothell, WA (US); Richard N. Johnson, Anacortes, WA (US); W. James Renton, Kent, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/711,610

(22) Filed: Sep. 28, 2004

(65) Prior Publication Data

US 2005/0253020 A1    Nov. 17, 2005

Related U.S. Application Data

(63) Continuation-in-part of application No. 10/847,739, filed on May 17, 2004.

(51) Int. Cl.
*B64C 9/00* (2006.01)
(52) U.S. Cl. .............................. 244/118.1; 244/137.1; 244/137.2
(58) Field of Classification Search ............ 244/129.5, 244/118.1, 137.1, 137.2, 118.5; 14/71.5; 414/344–345, 392; 340/568.1
See application file for complete search history.

(56) References Cited

U.S. PATENT DOCUMENTS

| | | | |
|---|---|---|---|
| 1,867,602 A | | 7/1932 | Stukenborg |
| 3,059,712 A | | 10/1962 | Hautau |
| 3,419,164 A | * | 12/1968 | O'Neill ..................... 414/345 |
| 3,556,441 A | * | 1/1971 | Oberlander ............. 244/114 R |
| 3,595,407 A | * | 7/1971 | Muller-Kuhn et al. ...... 414/344 |
| 3,730,359 A | * | 5/1973 | Andersson ................. 414/392 |
| 3,762,670 A | | 10/1973 | Chillson |
| 3,874,619 A | | 4/1975 | Collins et al. |
| 3,977,631 A | | 8/1976 | Jenny |
| 4,312,619 A | | 1/1982 | Anderson et al. |
| 4,416,435 A | * | 11/1983 | Szendrodi et al. ...... 244/114 R |
| 4,658,874 A | | 4/1987 | von Meyerinck |
| 4,659,039 A | | 4/1987 | Valdes |
| 4,993,463 A | | 2/1991 | von Meyerinck |
| 5,600,303 A | * | 2/1997 | Husseiny et al. ......... 340/568.1 |
| 5,881,973 A | * | 3/1999 | Agajanian et al. ....... 244/129.5 |

(Continued)

FOREIGN PATENT DOCUMENTS

DE    3743393    3/1989

(Continued)

Primary Examiner—Timothy D. Collins
(74) Attorney, Agent, or Firm—Ostrager Chong Flaherty & Broitman P.C.

(57) ABSTRACT

An integrated operational ground mobility and support system (10) that includes an aircraft (12) having one or more service openings on a side of the aircraft (12). The integrated support system (10) may have an airport interface terminal docking port (14) that has a ground support service sub-system. The docking port (14) mates with the aircraft (12) at the service openings and has multiple service levels. The ground support service sub-system provides services to the aircraft (12) through the service openings and on the service levels. The integrated support system (10) may have in addition to or in replacement of the interface terminal docking port an aircraft loader/unloader. The loader/unloader has ground support service sub-systems and mates with the aircraft (12) at one or more of the service openings. The service sub-systems of the loader/unloader include a passenger ingress/egress system (62) and provide services to the aircraft (12).

30 Claims, 26 Drawing Sheets

U.S. PATENT DOCUMENTS

| | | | |
|---|---|---|---|
| 6,808,142 B2 * | 10/2004 | Oki | 244/118.1 |
| 6,863,243 B2 * | 3/2005 | Konya et al. | 244/137.2 |
| 6,928,363 B2 * | 8/2005 | Sankrithi | 244/50 |
| 6,974,928 B2 * | 12/2005 | Bloom | 700/215 |
| 2002/0104176 A1 * | 8/2002 | Thomas et al. | 14/71.5 |
| 2002/0120392 A1 | 8/2002 | Stratton | |
| 2003/0028336 A1 | 2/2003 | Masar et al. | |
| 2003/0105567 A1 | 6/2003 | Koenig et al. | |
| 2004/0186634 A1 | 9/2004 | Lucky et al. | |

FOREIGN PATENT DOCUMENTS

| | | |
|---|---|---|
| DE | 29612083 U | 9/1996 |
| EP | 0150686 | 8/1985 |
| EP | 0756556 B1 | 2/1997 |
| GB | 673998 A | 6/1952 |
| GB | 674118 A | 6/1952 |
| GB | 2014948 A | 9/1979 |
| GB | 2231073 | 11/1990 |
| JP | 60042108 | 3/1985 |
| WO | WO91/00214 A | 1/1991 |
| WO | WO9529094 | 11/1996 |
| WO | WO 02/42151 A | 5/2002 |
| WO | WO03072435 | 9/2003 |
| WO | WO 2005/035358 A2 | 4/2005 |
| WO | WO 2006/078322 A2 | 7/2006 |

* cited by examiner

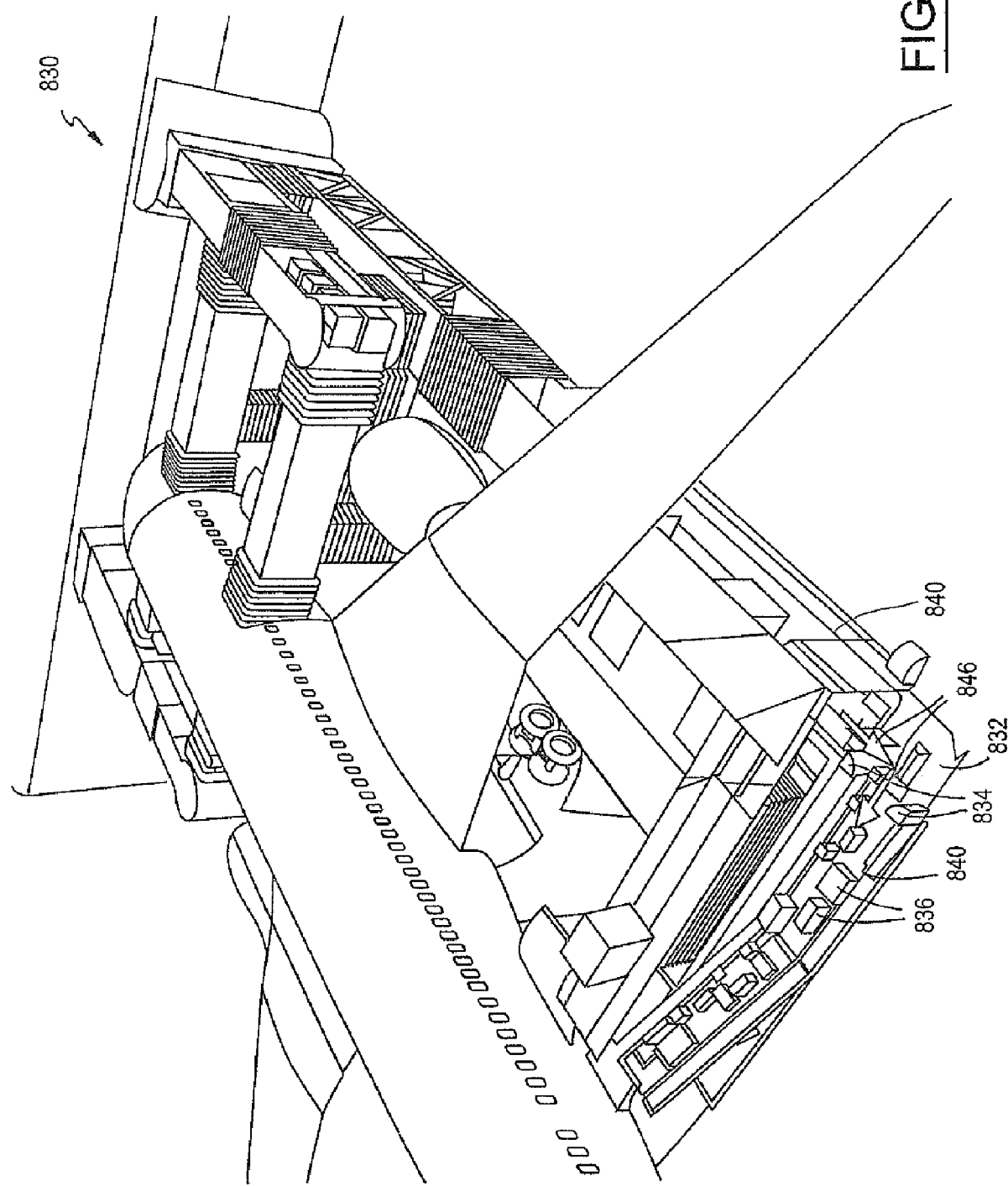

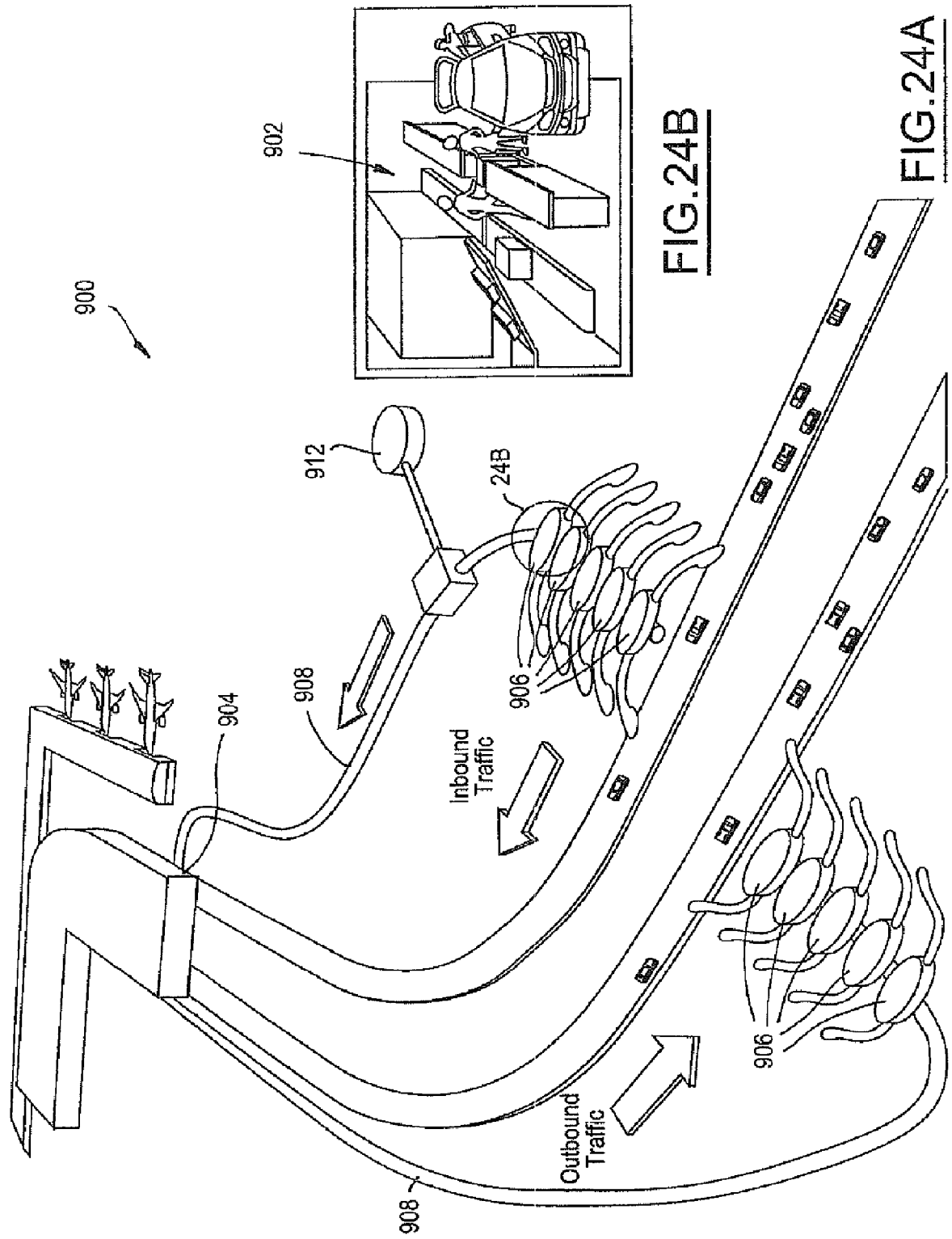

OPERATIONAL GROUND SUPPORT SYSTEM

RELATED APPLICATION

The present application is a continuation-in-part (CIP) application of U.S. patent application Ser. No. 10/847,739, filed on May 17, 2004, entitled "Operational Ground Support System," which is incorporated by reference herein.

TECHNICAL FIELD

The present invention relates generally to aeronautical vehicle ground support systems and automated, controlled ground mobility. More particularly, the present invention relates to integrated systems and methods of providing ground support services and controlled mobility between touch down and takeoff of an aircraft.

BACKGROUND OF THE INVENTION

It is desirable within the airline industry to provide efficient aircraft servicing and ground mobility. Time involved in taxiing to and from gates and in performing various servicing tasks, is directly related to the amount of time an aircraft is able to spend in flight. The more an aircraft is in flight the higher the potential profits associated with that aircraft.

Servicing an aircraft includes passenger boarding and de-planing of the aircraft, cargo servicing, galley servicing, and passenger compartment servicing, which includes cabin cleaning. Timing, sequencing, fueling, air supply, potable water supply, waste water drainage, electrical supply, brake cooling, communications links, and the manner in which aircraft services are performed and provided regulate the turnaround time of an aircraft.

Currently, servicing is performed utilizing passenger-bridges and service vehicles for passenger servicing, galley servicing, cabin cleaning, fueling, air supply, electricity supply, waste water disposal, potable water refurbishment, and cargo handling. Typical passenger-bridges are capable of extending, through the use of telescoping sections, to mate with the aircraft. Passengers servicing refers to the enplaning and deplaning over passenger-bridges on a port side of the aircraft. Vehicles for galley servicing, cabin cleaning, fueling, waste water disposal, potable water refurbishment, and electricity supply are provided at points on either side of the aircraft. The passenger servicing task is performed sequentially with the galley and cabin cleaning servicing in order to prevent interference with passengers and servicing crewmembers.

The potential for interference with passengers and servicing crewmembers exists in forward portions of the aircraft since the passengers deplane in the forward portion of the aircraft and passengers and servicing crewmembers use the same aisles of the aircraft. Servicing crewmembers are able to service aft portions of the aircraft, when an aircraft requires such servicing, simultaneously with deplaning of the aircraft, as no interference exists during the deplaning between passengers and crew members in the aft portion of the aircraft.

Three main types of airline bridges currently exist for passenger enplaning and deplaning of an aircraft. The three types are an apron drive bridge, a radial bridge, and a fixed pedestal bridge. The apron drive bridge is the most complex due to its rotating and telescoping capabilities, which allow for some freedom in parking location of an aircraft on an apron. The radial bridge and the fixed pedestal bridge require that the aircraft be parked at a specific spot on the apron. The radial bridge is rotated to mate a bridgehead to a passenger door. The fixed pedestal bridge is the least expensive of the three main types of bridges. The fixed pedestal bridge has a fixed main portion and an adjustable bridgehead. The pedestal bridge has a bridgehead that retracts when an aircraft is approaching an apron and extends when the aircraft is parked, at which time the bridgehead docks to an aircraft passenger door.

The use of galley servicing, cabin cleaning, fueling, air supply, electric supply, waste water disposal, potable water refurbishment, and cargo handling vehicles can be time consuming due to the steps involved in servicing the aircraft and the aircraft servicing location availability. The servicing vehicles typically need to be loaded at a location that is a considerable distance from and driven over to an airline terminal of interest, mated to the aircraft, and unloaded to service the aircraft. Aircraft servicing location availability is limited since most vehicle servicing of the aircraft can only be performed from the starboard side of the aircraft to prevent interference with the passenger bridge on the port side of the aircraft. The hydrant fuel, aft cabin cleaning, and aft lavatory service trucks can access the port side. Mating of the servicing vehicles to the aircraft is also undesirable since an aircraft can potentially be damaged.

Current servicing of an aircraft is not efficient and current bridge designs are not physically applicable to newly introduced faster flying aircraft. For example, a sonic cruiser is being studied by The Boeing Company that has a canard wing in an upper forward portion of the aircraft, which interferes with current passenger bridge designs. Also, due to the relationship of aircraft servicing doors and aircraft wings, long turnaround times are required for servicing the sonic cruiser. The longer time spent servicing the aircraft on the ground negates the benefit of the faster flying capability in terms of overall aircraft utilization. System inefficiency of existing infrastructure and current aircraft fleet present restrictions encountered by the Sonic Cruiser.

Also, current systems and methods used for ground support of commercial aircraft are security limited. It is difficult to provide and maintain adequate and appropriate security with regard to an aircraft, due to the number of different services accessing the aircraft at multiple locations along either side of the aircraft while at a terminal gate.

Additionally ground support services can also adversely affect passenger experience with flying, as a result of the somewhat chaotic fashion in which ground support services are currently provided.

It is therefore desirable to provide improved aircraft servicing systems and methods with increased servicing efficiency and aircraft security, which also provide an improved passenger flying experience. It is also desirable that the improved servicing systems address both current infrastructure incompatibility limitations related to the introduction of aircraft and other inefficiencies associated with current aircraft and systems.

SUMMARY OF THE INVENTION

The present invention provides an integrated operational ground mobility and support system that includes an aircraft having one or more service openings on a side of the aircraft. The integrated support system may have an airport interface terminal docking port that has a ground support service sub-system. The interface terminal docking port mates with the aircraft at the service openings and has multiple service levels. The ground support service sub-system provides services to the aircraft through the service openings and on the service levels. The integrated support system may have in addition to or in replacement of the interface terminal docking port an aircraft loader/unloader. The loader/unloader has ground support service sub-systems and mates with the aircraft at one or more of the service openings. The service sub-systems of the loader/unloader include a passenger ingress/egress system and provide services to the aircraft.

In another embodiment of the present invention, an aircraft is provided that has the capability to be directed and controlled externally both to and from a terminal. The directing of the aircraft may be enabled by a motorized wheel, which is located in the nose gear of the aircraft, or by aircraft main engines. The motorized wheel is powered by an onboard auxiliary power unit or by a ground based power supply. The aircraft may be guided using a guidance control system of the aircraft.

The embodiments of the present invention provide several advantages. One such advantage is the provision of an integrated operational ground support system that allows for aircraft servicing through the nose or through automated service ports, located on the lower lobe regions forward of the wings on the port and starboard sides of the aircraft. The stated embodiment allows for passenger ingress/egress, cargo ingress/egress, primary system and secondary system servicing, and health and maintenance monitoring through the nose or simultaneously through the use of multiple level servicing bridges on port and starboard sides of the aircraft. In so providing, the stated embodiment provides increased servicing efficiency through simultaneous servicing thereof and provides improved aircraft security.

Servicing through the nose of an aircraft can eliminate the need for side passenger and cargo doors for ingress/egress of passengers and cargo. The elimination of side doors allows for interior space of the aircraft to be more efficiently utilized for increased passenger seating. Forward loading also enhances the cargo space within an aircraft. Forward loading or loading through the nose of an aircraft eliminates the need for a wing carry through center section that typically splits the cargo hold of an aircraft into forward and aft compartments. Front loading simplifies the structure and reduces the weight of an aircraft by utilizing a single set of front doors instead of fore and aft cargo doors. In addition, the front doors are located forward of aircraft areas that experience prime bending loads, which maintains proper door seating over time.

Furthermore, another advantage provided by an embodiment of the present invention is the provision of a terminal carry-on system that allows for the pre-loading of carry-on articles into carry-on transport modules. The carry-on system provides increased efficiency in passenger ingress and egress, aids in minimizing any apprehensions that passengers may have in becoming separated from their articles, and minimizes competition between passengers in first accessing or utilizing a overhead compartment storage area or the like. The terminal carry-on system significantly increases ingress and egress speed by facilitating the stowage and retrieval of personal articles within a terminal prior to and after embarkation. Passengers are able to ingress without carrying carry-ons to their respective seats without competition from co-passengers for overhead stowage. Upon arrival to a terminal, the passengers may egress from the aircraft and retrieve their personal effects within the terminal.

Yet another advantage provided by an embodiment of the present invention is the provision of operational ground support systems that utilize passenger transport modules. The passenger transport modules are used to shuttle passengers into and out of an aircraft. Again increasing passenger ingress/egress efficiency and providing an improved passenger overall flying experience. The passenger ingress/egress modules allow an aircraft to operate out of airports, which do not have the above-stated docking ports. The transport modules also allow an aircraft to operate at remote airport locations during instances of high gate demand.

Moreover, additional advantages provided by other embodiments of the present invention are the provisions of a passenger-cargo loader/unloader and a portable ground servicing unit. These state embodiments allow for servicing of an aircraft from locations other than at airport interface terminals and provide similar through aircraft nose servicing, as stated above. These embodiments also account for airports where terminal availability is limited.

The present invention itself, together with further objects and attendant advantages, will be best understood by reference to the following detailed description, taken in conjunction with the accompanying drawing.

Figure 11:
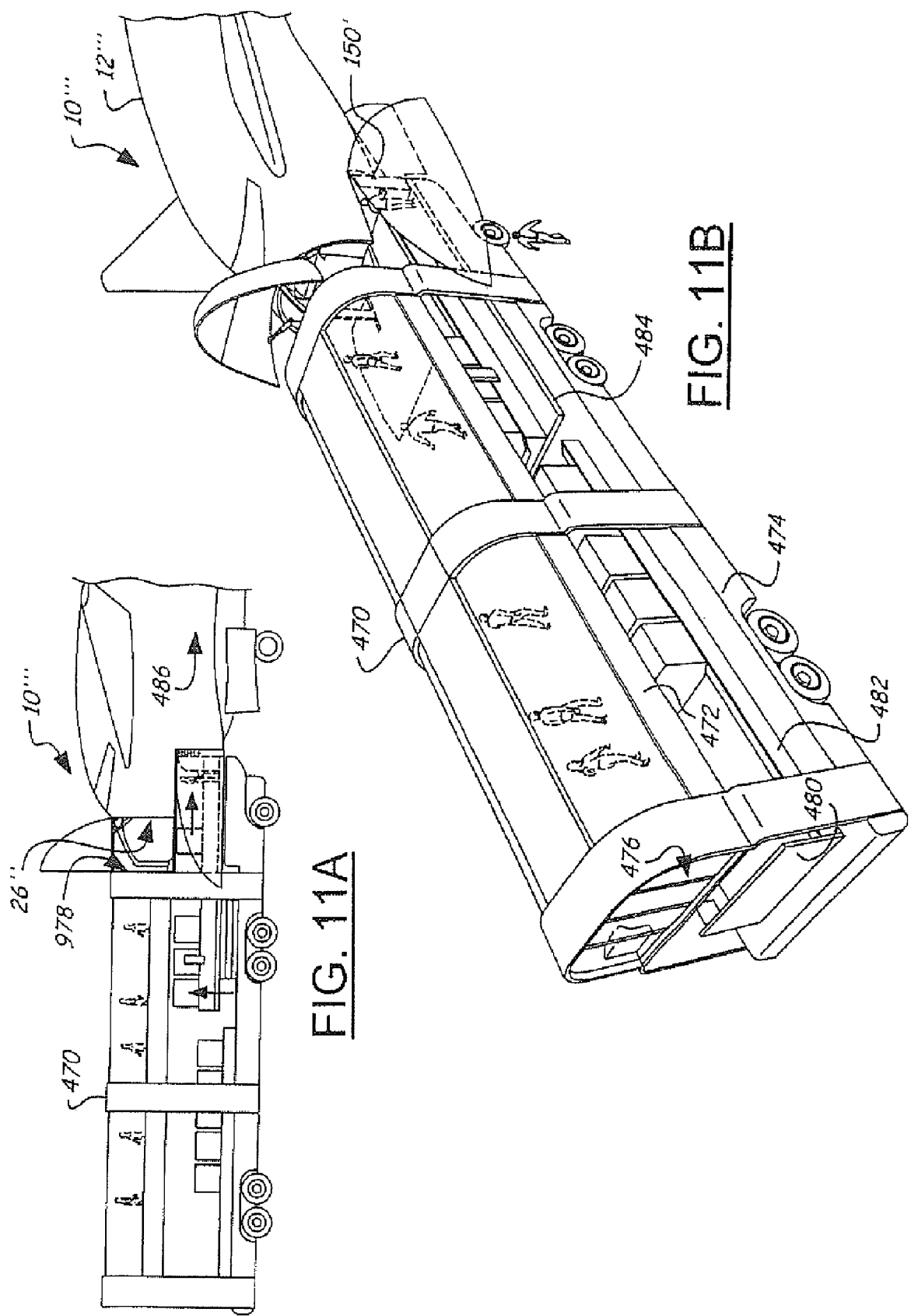
FIG. 11A is a side view of an integrated operational ground support system incorporating the use of a passenger/ cargo loader-unloader in accordance with another embodiment of the present invention.
Figure 12:
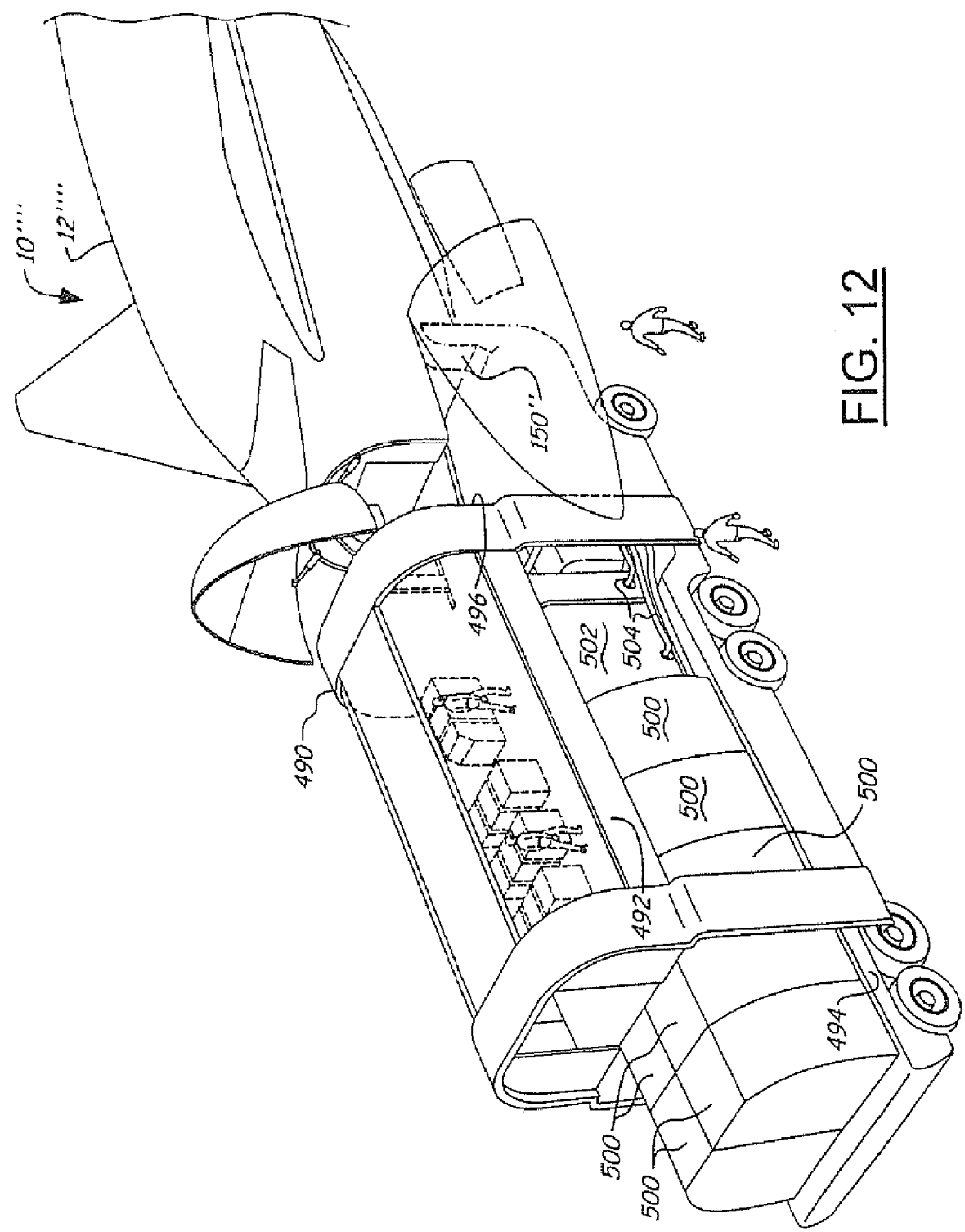
Figure 13:
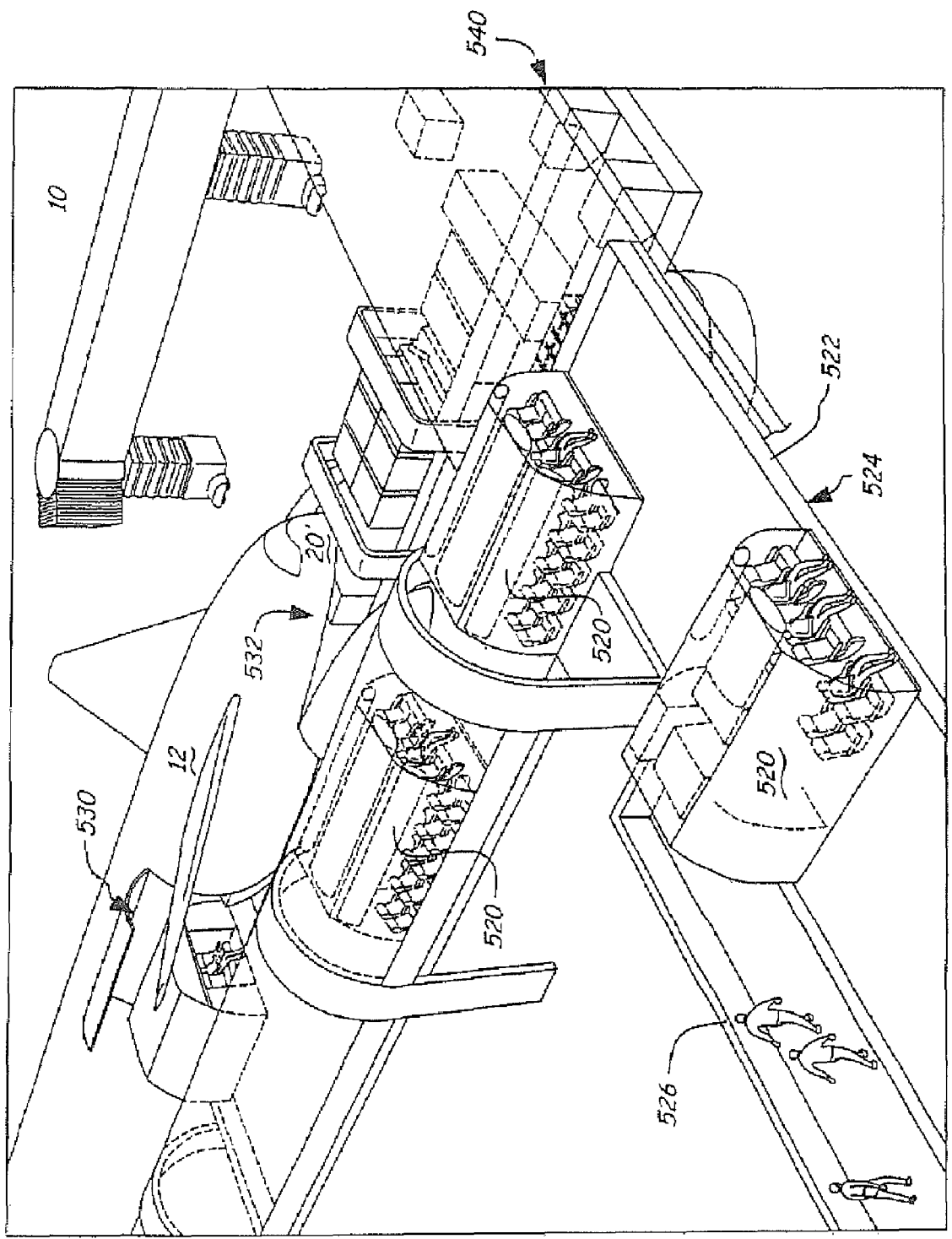
Figure 14:
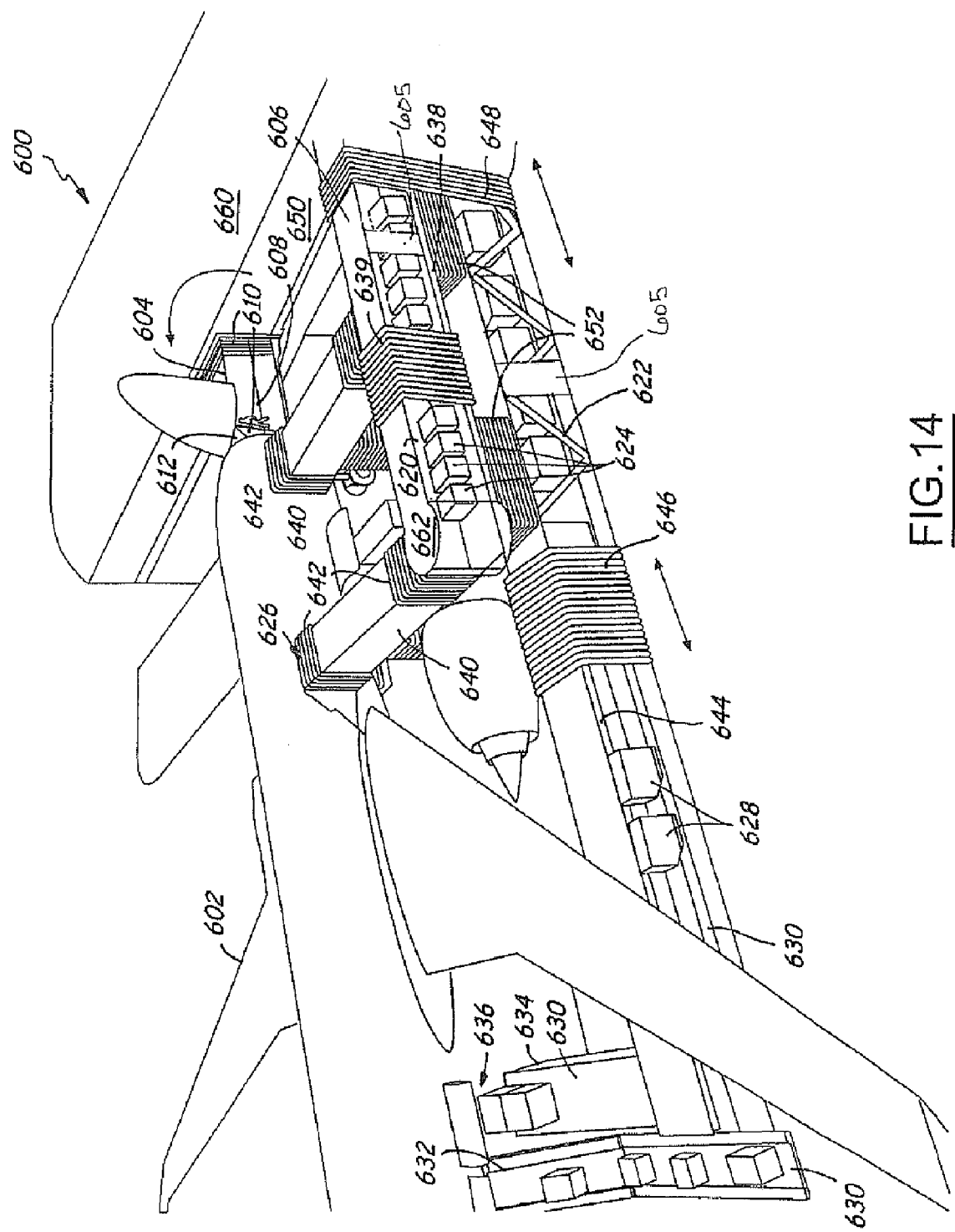
Figure 15:
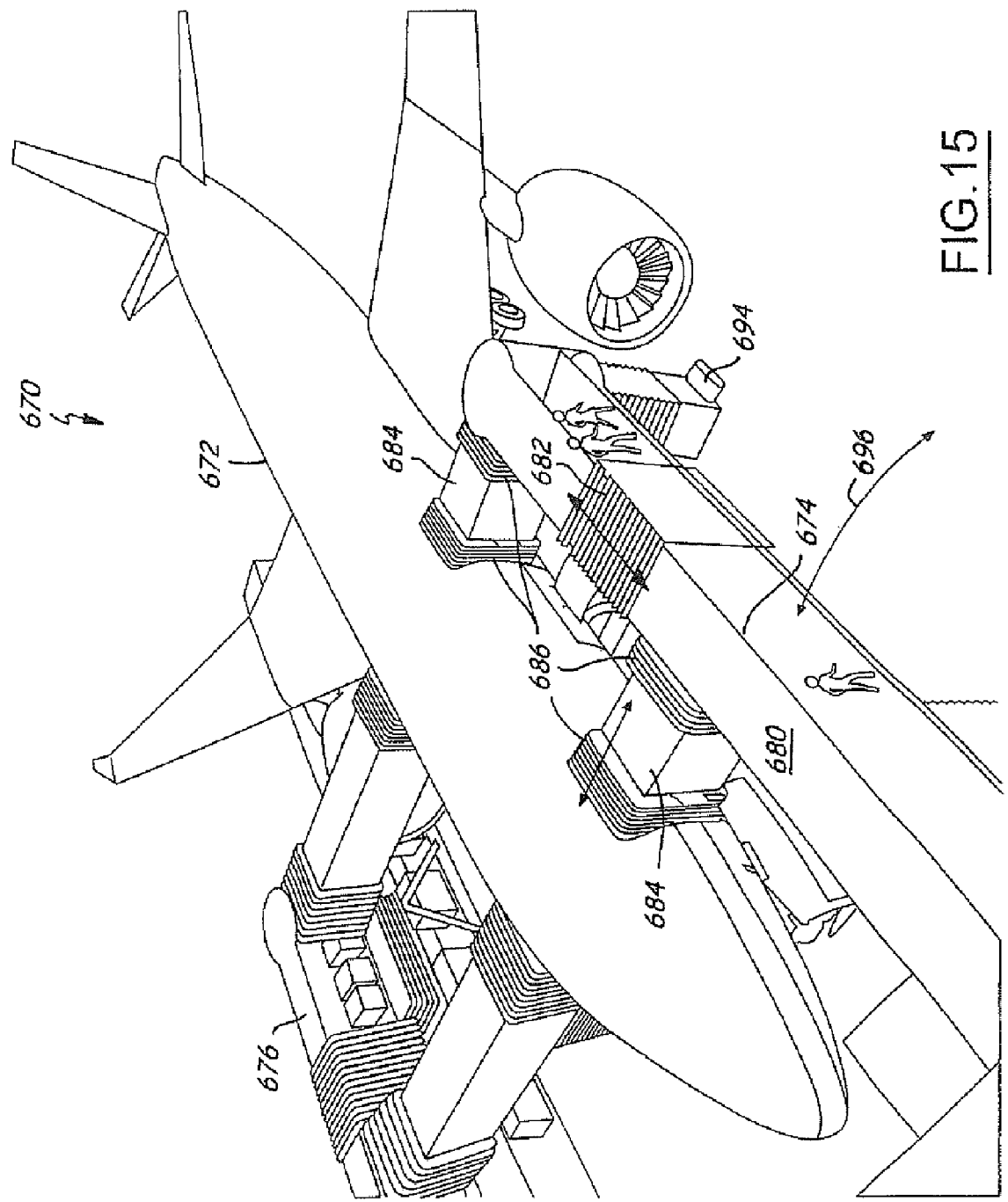
Figure 16:
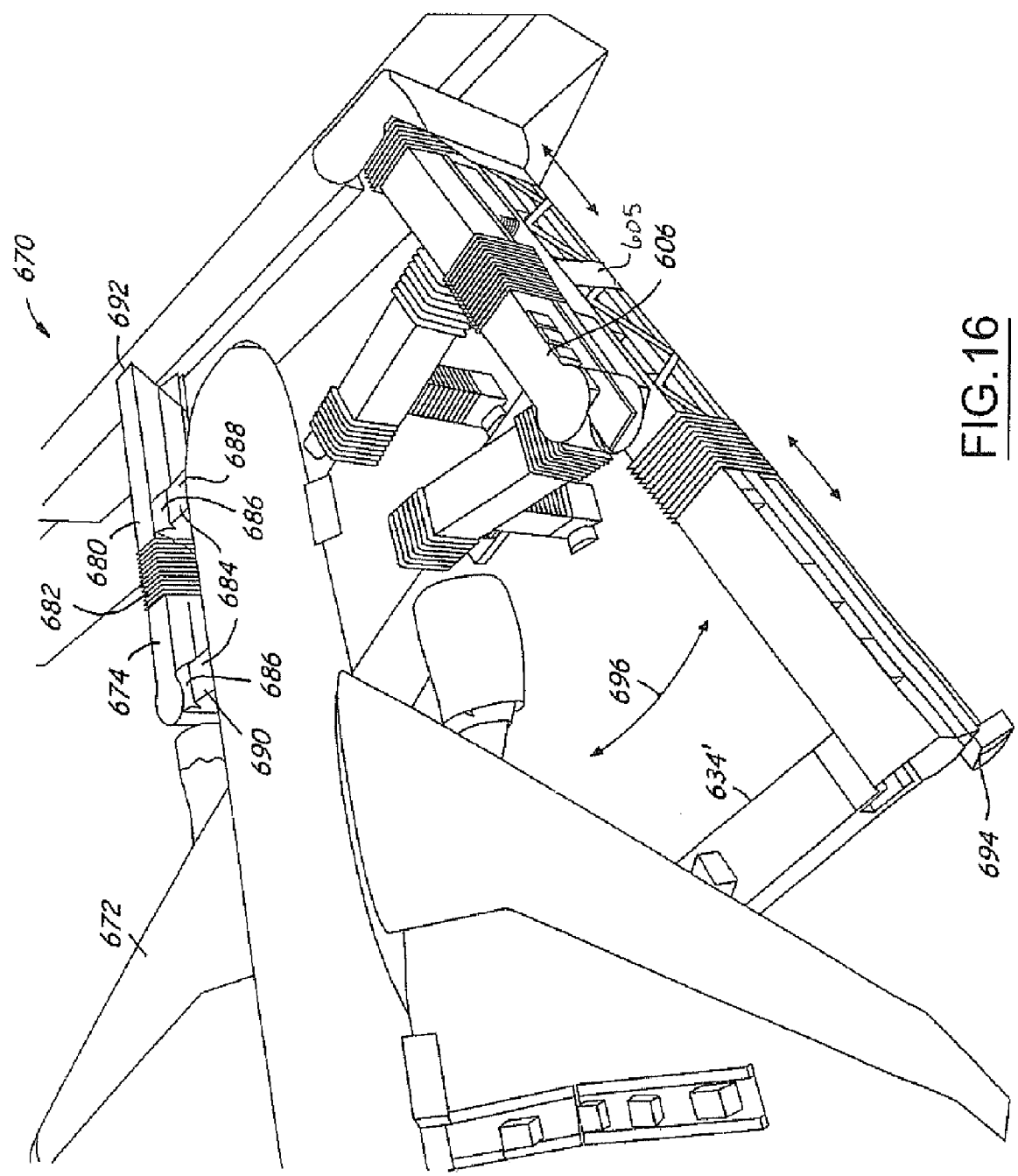
Figure 17:
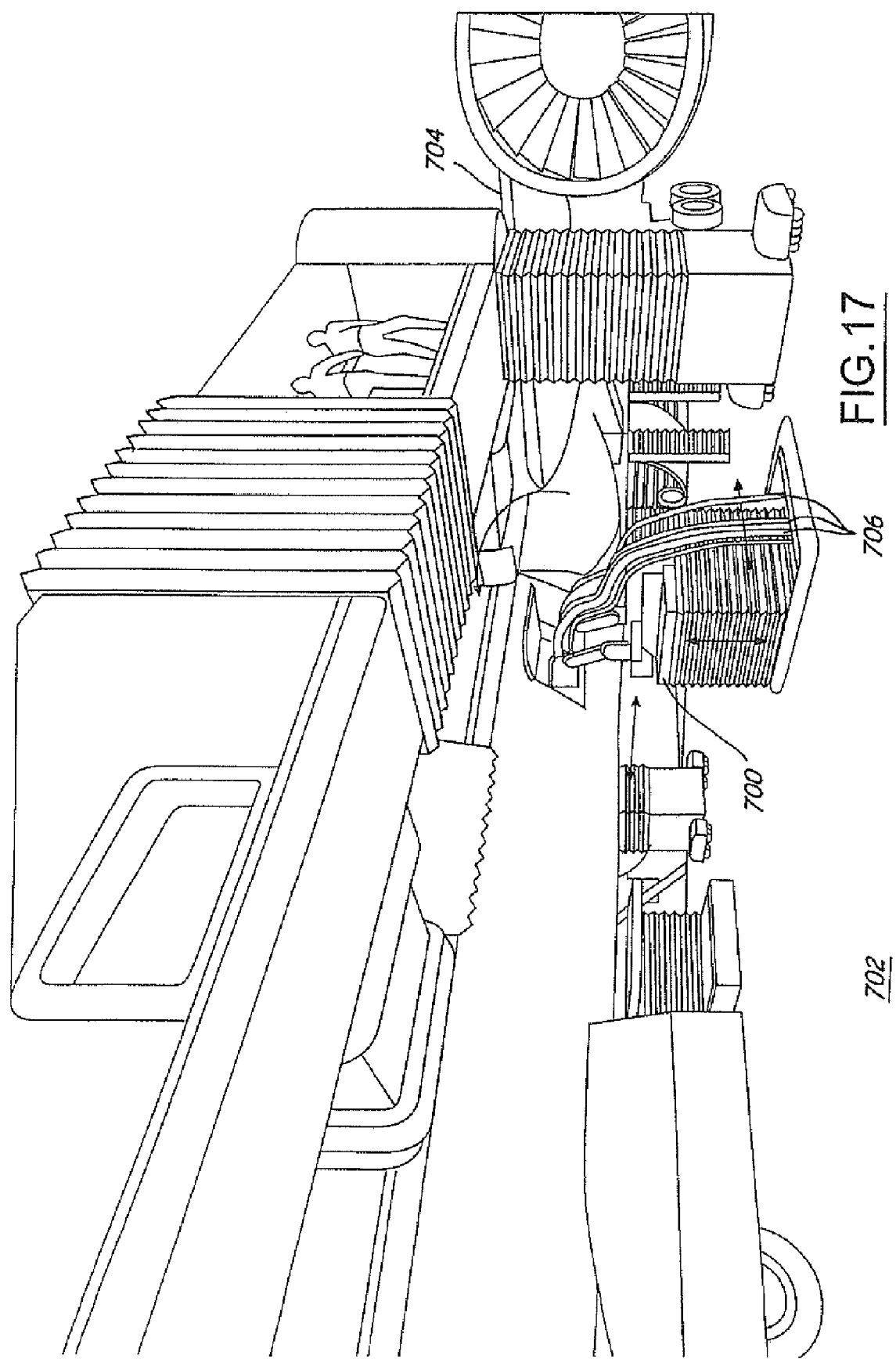
Figure 18:
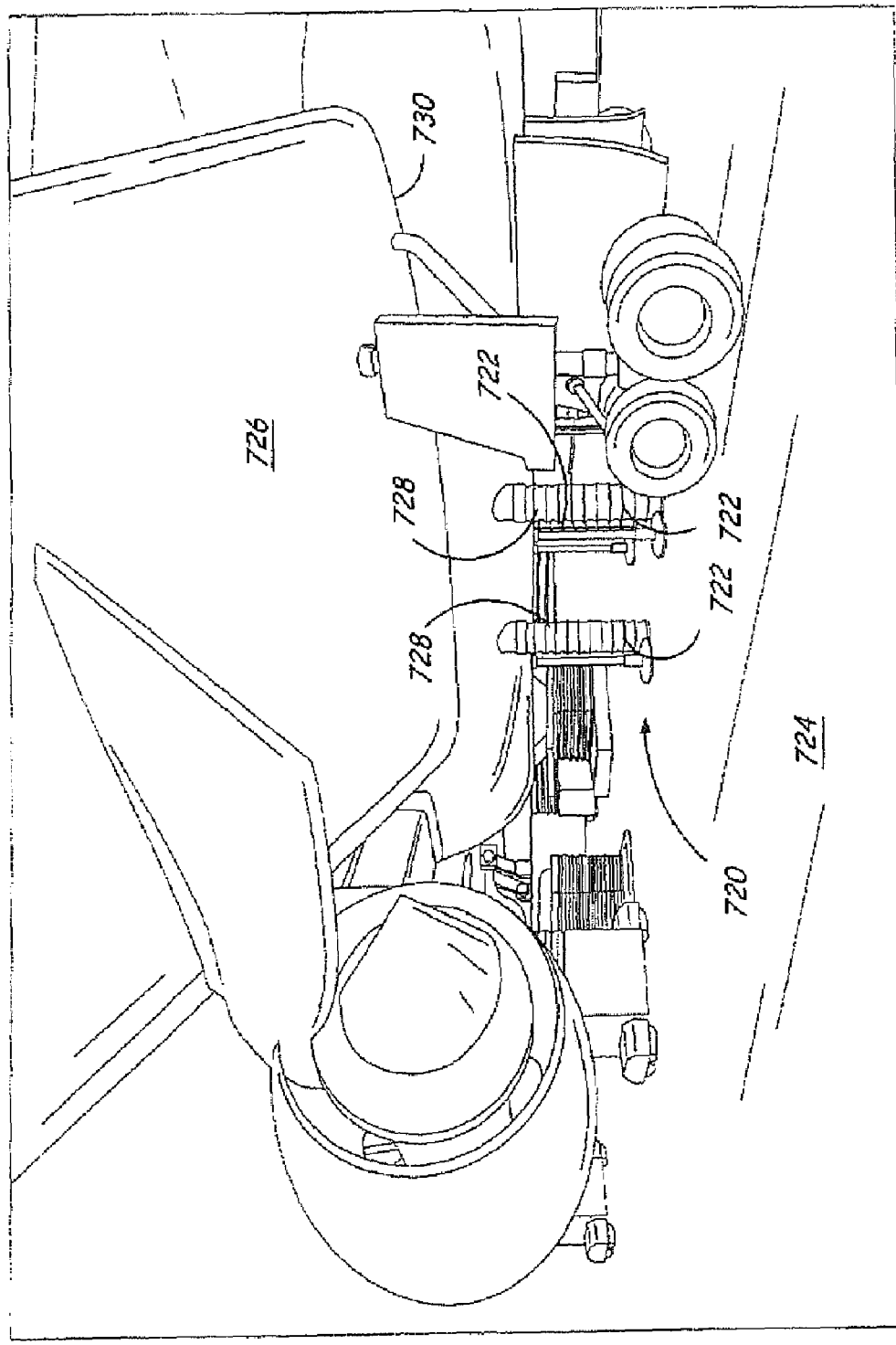
Figure 19:
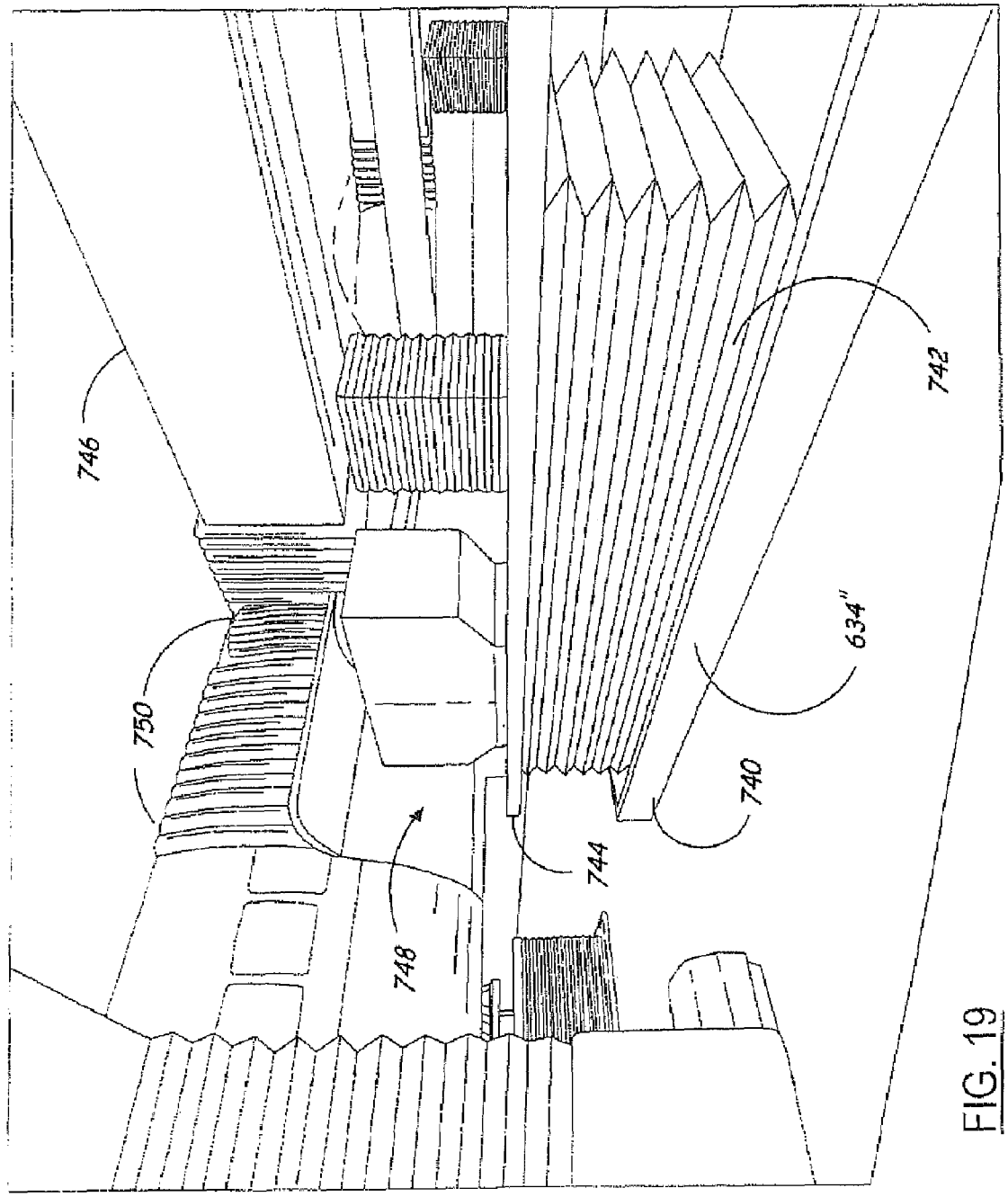
Figure 20:
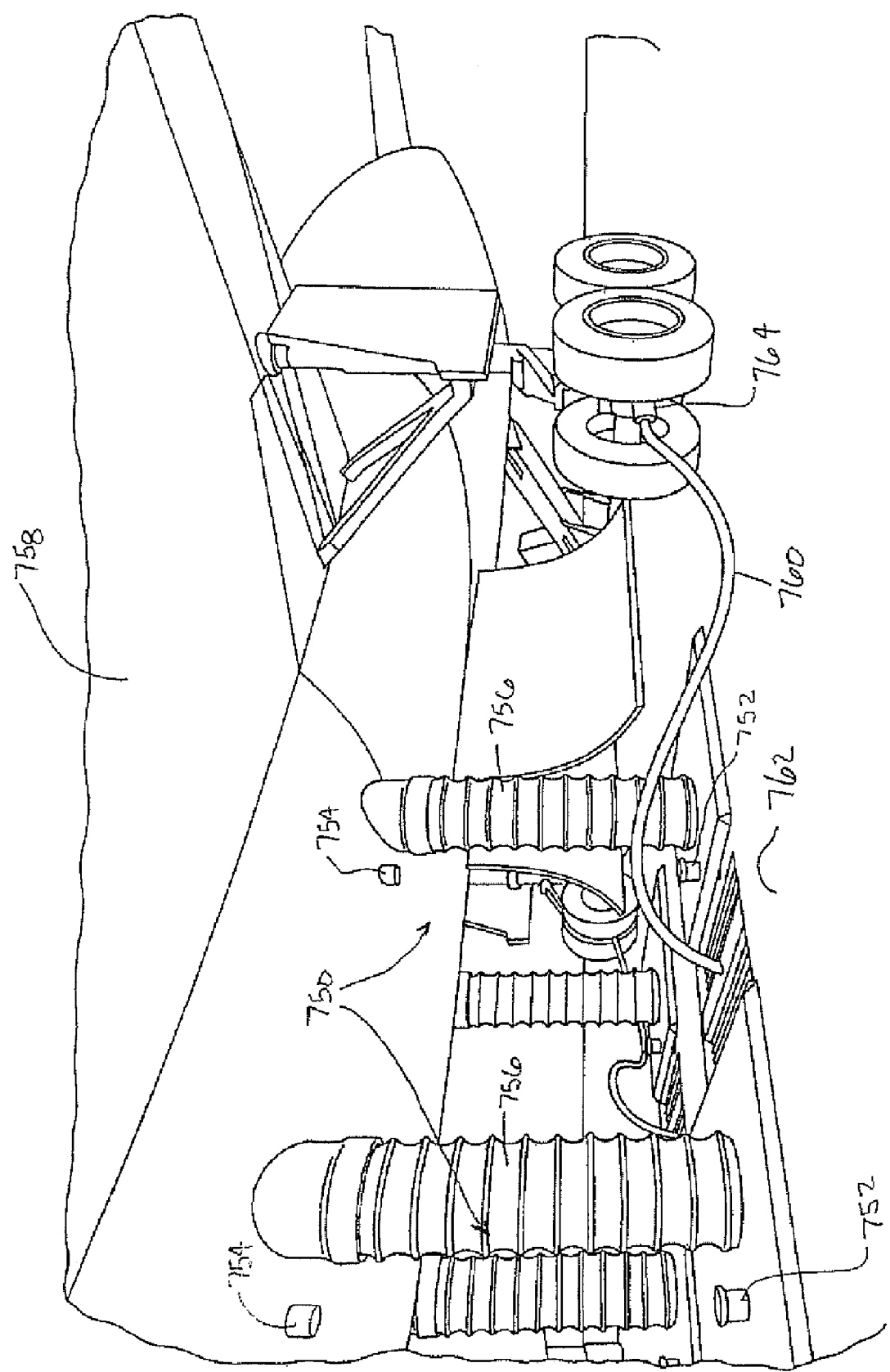
Figure 21:
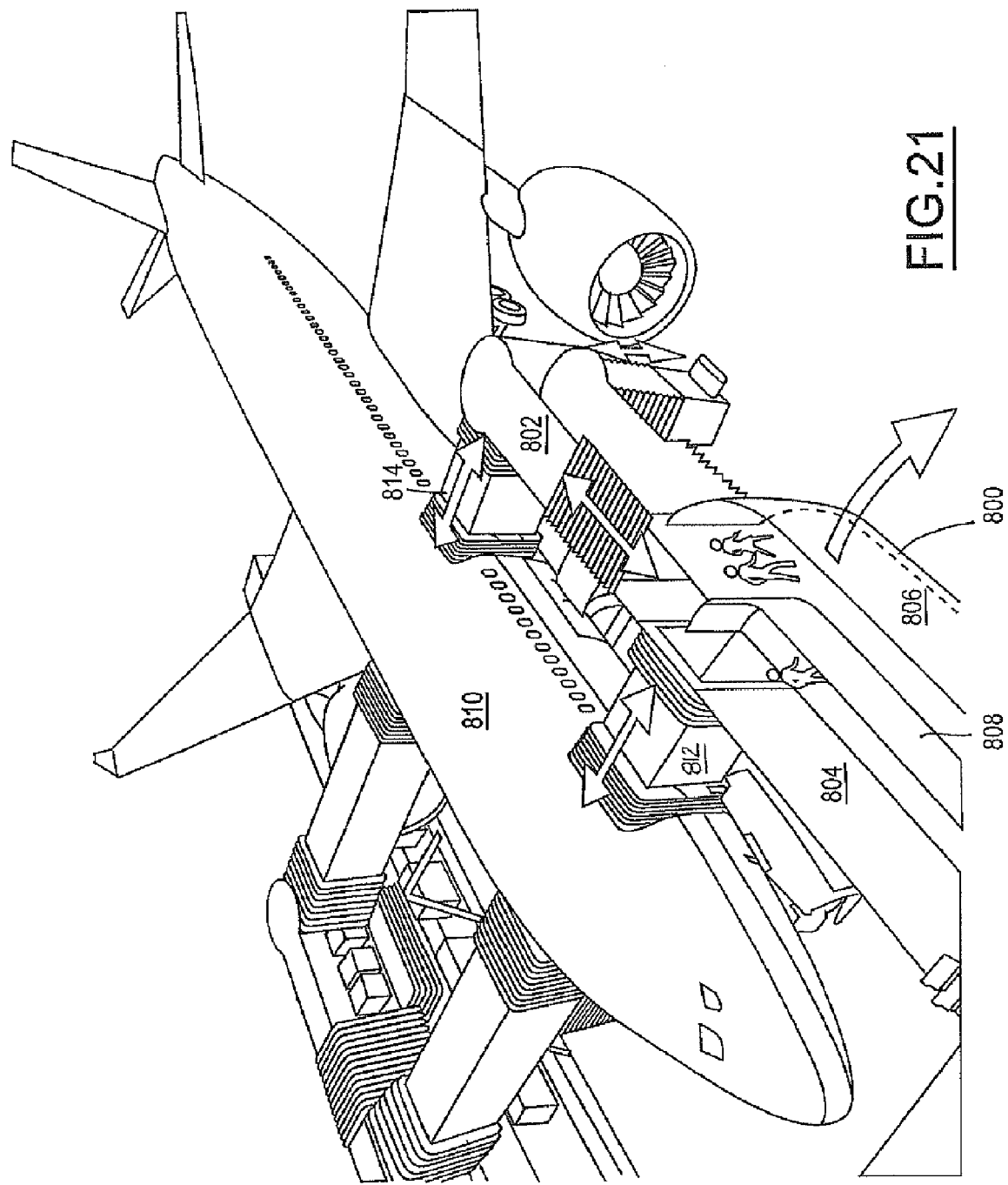
Figure 22B:
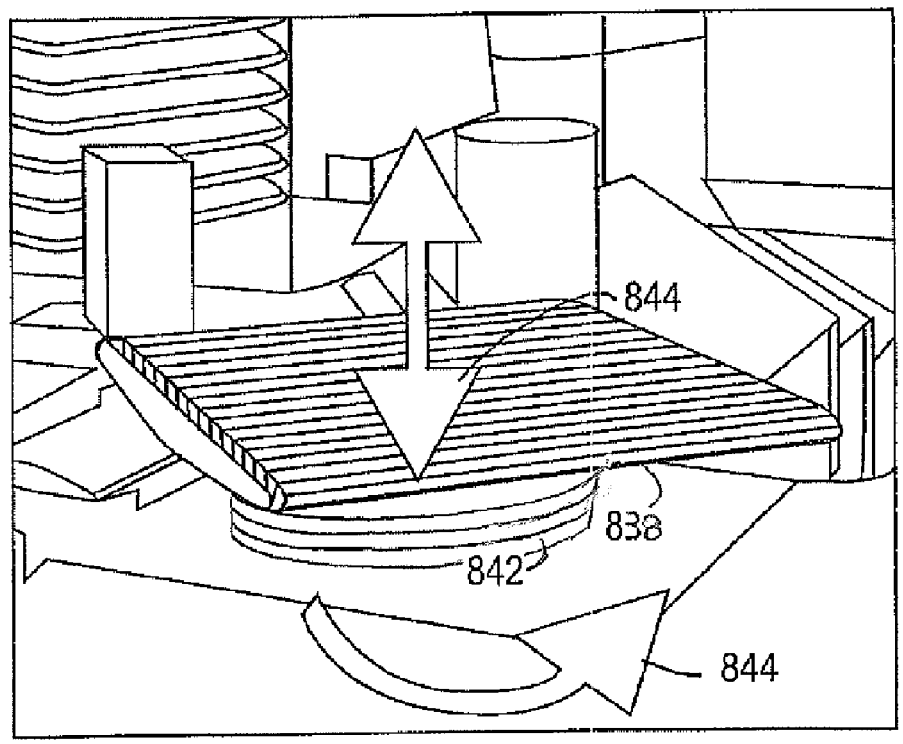
Figure 22C:
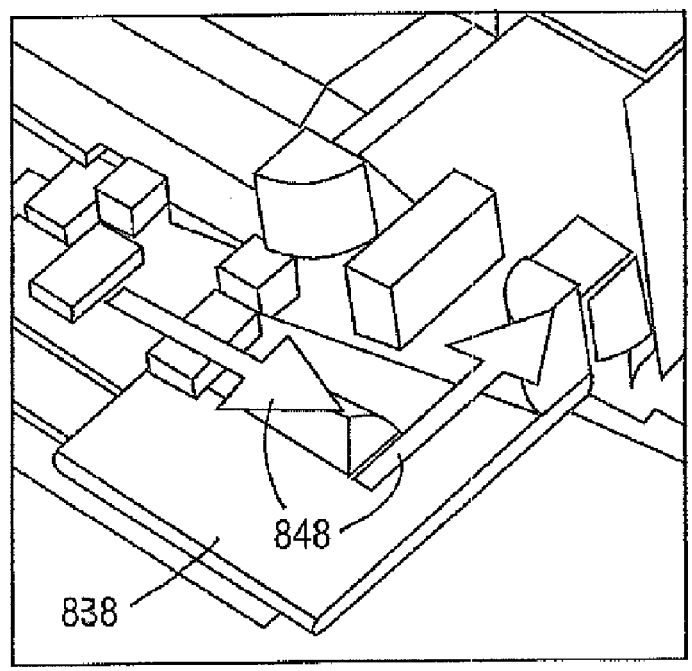
Figure 23:
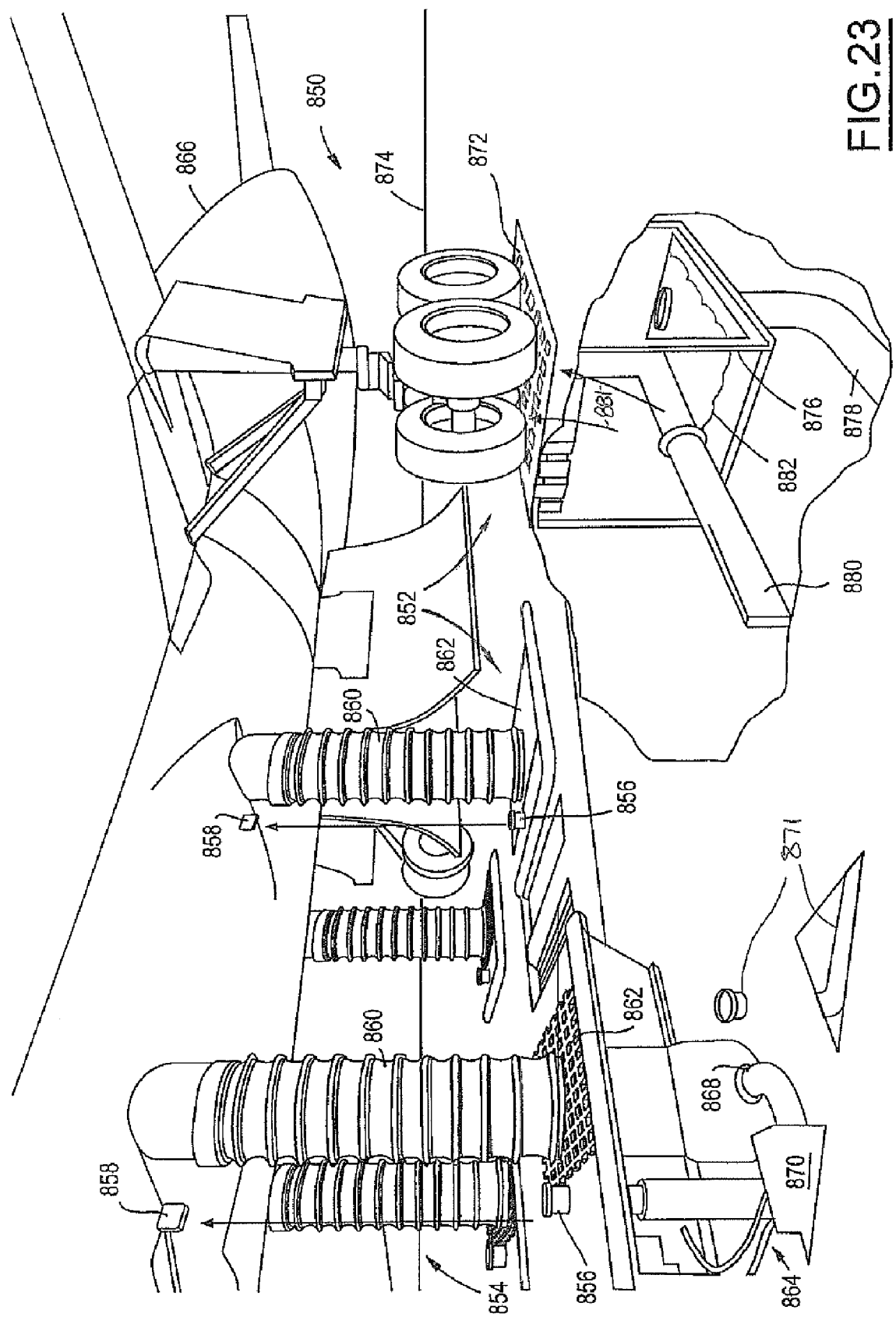

FIG. 11B is a perspective view of the integrated operational ground support system of FIG. 11A;

FIG. 12 is a perspective view of an integrated operational ground support system incorporating the use of a portable ground servicing unit in accordance with another embodiment of the present invention;

FIG. 13 is a perspective view of a an integrated operational ground support system incorporating the use of passenger transport modules in accordance with still another embodiment of the present invention;

FIG. 14 is a perspective view of an integrated operational ground support system for an aircraft in accordance with another embodiment of the present invention;

FIG. 15 is a perspective view of an integrated operational ground support system for an aircraft in accordance with yet another embodiment of the present invention;

FIG. 16 is a perspective view of the ground support system of FIG. 15 illustrating servicing bridge pivot motion;

FIG. 17 is a perspective view of a tarmac interface service system in accordance with an embodiment of the present invention;

FIG. 18 is a perspective view of a fuel hydrant supply system in accordance with yet another embodiment of the present invention;

FIG. 19 is a perspective view of a linear drive cargo lift in accordance with yet another embodiment of the present invention;

FIG. 20 is a perspective view of a machine vision alignment system in accordance with another embodiment of the present invention;

FIG. 21 is a perspective view of a passenger servicing bridge having a double door jetway in accordance with another embodiment of the present invention;

FIG. 22A is a perspective view of a ground support system incorporating a 90° adjustable feed direction platform in accordance with another embodiment of the present invention;

FIG. 22B is a perspective view of the feed platform of FIG. 22A switching convey direction;

FIG. 22C is a perspective view of the feed platform of FIG. 22A in an off-loading mode;

FIG. 23 is a perspective view of a fuel hydrant supply and brake cooling system incorporating a drainage system in accordance with another embodiment of the present invention;

FIG. 24A is an overhead perspective view of a remote baggage handling system in accordance with another embodiment of the present invention; and FIG. 24B is a perspective view of a baggage drop-off terminal in accordance with another embodiment of the present invention.

DETAILED DESCRIPTION

In each of the following Figures, the same reference numerals are used to refer to the same components. While the present invention is described with respect to systems and methods of servicing an aircraft, the present invention may be adapted for various applications and systems including: aeronautical systems, land-based vehicle systems, or other applications or systems known in the art that require servicing of a vehicle.

In the following description, various operating parameters and components are described for one constructed embodiment. These specific parameters and components are included as examples and are not meant to be limiting.

Also, in the following description the terms "service", "services", and "servicing" may include and/or refer to any aircraft services, such as passenger ingress/egress services, cargo ingress/egress services, aircraft primary services, aircraft secondary services, galley services, cabin cleaning services, lavatory services, or other services known in the art. Primary services may include fuel, power, water, waste, air conditioning, engine start air, brake cooling, and other primary services. Secondary services may include cabin cleaning services, galley services, trash services, and other secondary services.

Figure 1:
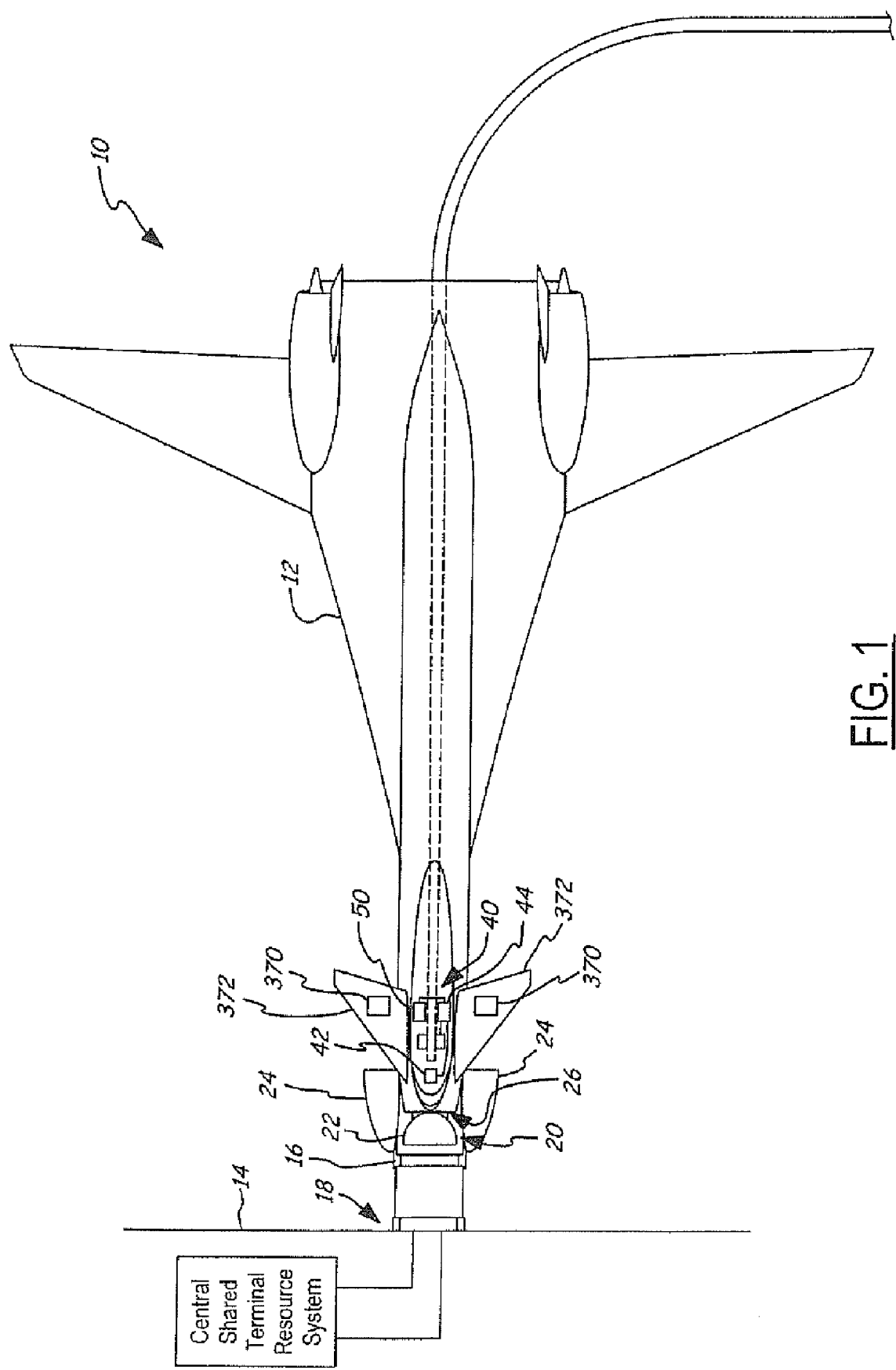
FIG. 1 is a top view of an integrated operational ground support system for an aircraft in accordance with an embodiment of the present invention.
Figure 2A:
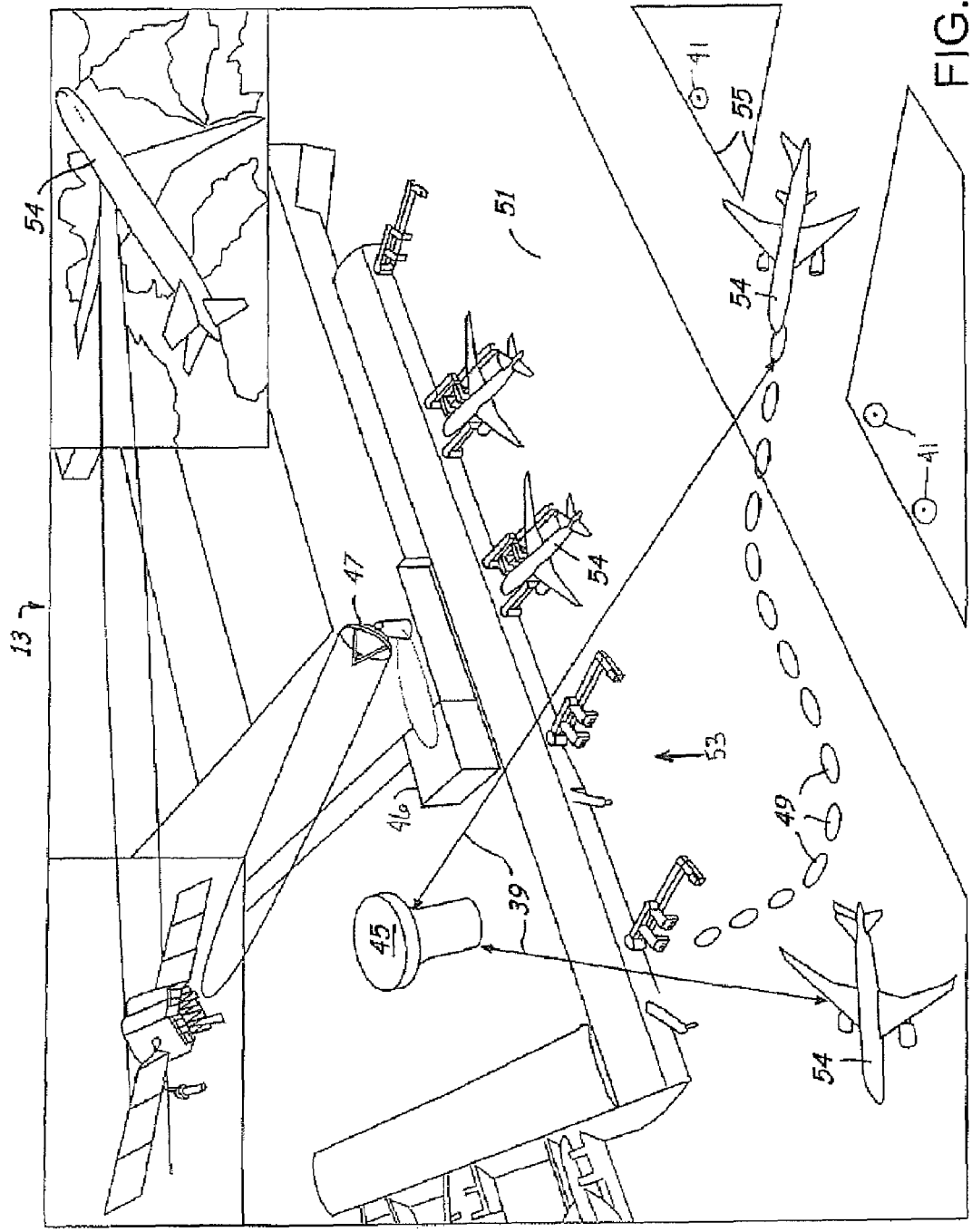
FIG. 2A is a top view of an airport illustrating aircraft guidance and mobility including aircraft departure in accordance with an embodiment of the present invention.
Figure 2B:
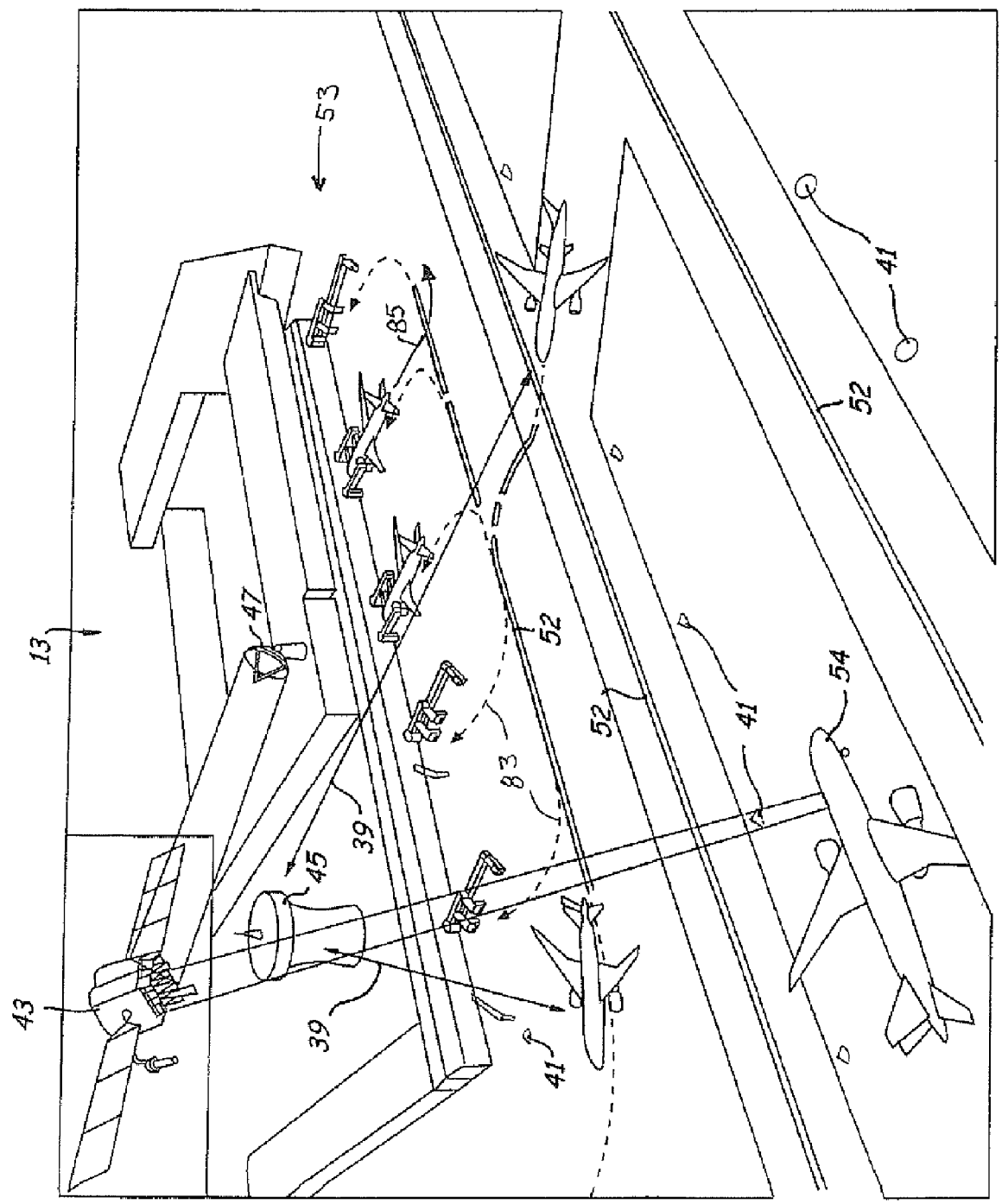
FIG. 2B is a top view of an airport illustrating aircraft guidance and mobility including aircraft arrival in accordance with an embodiment of the present invention.

Referring now to FIGS. 1-2B, a top view of an integrated operational ground support system 10 for an aircraft 12 and top views of an airport 13 illustrating aircraft guidance and mobility in accordance with an embodiment of the present invention is shown. Note that the aircraft shown in FIGS. 1-2B, as well as in FIGS. 3-9 and 11A-19, are for example purposes only, the present invention may be applied to various other aircraft known in the art. The integrated support system 10 includes the aircraft 12 and an airport interface terminal docking port 14 having a docking coupler or port 16. The aircraft 12 is shown at a particular gate 18 of the interface terminal 14. The aircraft 12 has a nose 20 that opens for the servicing of the aircraft 12 therethrough. The aircraft nose 20 may open in various manners. In the embodiment of FIG. 1, the nose 20 has an upper nose cap 22 and a pair of lower quarter covers 24, sometimes referred to as clamshell doors. The cap 22 and covers 24 are hinged to open in an upward direction and away from a service opening 26. Service opening 26 is one example of a service opening, other examples are provided below with respect to the other embodiments of the present invention. The interface terminal 14 services the aircraft 12 through the service opening 26. The interface terminal 14 provides such servicing through the use of various ground service support sub-systems, which are best seen in FIGS. 4-7. Other sample support sub-systems and integrated operational ground support systems are provided and described with respect to the embodiments of FIGS. 8-13.

The aircraft 12 may include an onboard aircraft terminal mating control system 40 for guidance of the aircraft 12 to and from the terminal 14. The onboard system 40 includes a global positioning system (GPS) or navigation system 42, which is in communication with GPS satellites 43 (only one is shown) and central tower 45 and is used by the controller 44 to guide the aircraft 12 upon landing on the ground to the terminal 14. This guidance may be referred to as vehicle free ramp operations. The airport infrastructure includes maintenance operations scheduling and support 46 and may be in communication with the aircraft 54 via the tower 45 or the ground antenna 47. Systems, equipment, and personal needed to perform unscheduled service requirements discovered in flight may be ready upon arrival of the aircraft 12 and 54 for such performance.

Guidance signals 39 are transmitted and received between the tower 45 and the aircraft 54 when on the tarmac 51. This assures that adequate ground separation is maintained and discreet source ground movement damage is minimized. The guidance signals are utilized for both arrival and departure as indicated by arrival arrows 83 and backup arrow 85.

The largest percentage of damage to an aircraft occurs while an aircraft is on the ground. The damage may occur when taxiing and colliding with other aircraft or ground equipment, or while parked at a terminal gate by support operations vehicles. The onboard system 40 guides the aircraft 12 by automated means and controls the speed and position of each individual aircraft while in motion. The onboard system 40 is tower controlled via automatic pilot and is employed for ground movement. By having aircraft at a particular airport under controlled motion, ground separation requirements can be reduced. A reduction in ground separation requirements increases airport capacity while reducing the risk of collision with other aircraft and objects.

Once the aircraft 12 is in close proximity with the terminal 14, a precision guidance system 50 is used in replacement of the navigation system 42. The precision guidance system 50 precisely guides the aircraft 12 to the docking port 16 using machine vision controlled pick and place robotics techniques known in the art. A near gate proximity guide-strip or guideline 52 is provided on the tarmac 51, which is used for rapid and precise guidance of the aircraft 12 to the docking port 16. A sample path of an aircraft is designated by the disks 49.

The ground support system 10 utilizes GPS cross runaway and tarmac route control. GPS cross runaway refers to the pavement connection between runways that the aircraft 12 crosses when taxiing to and from a terminal tarmac area 51. Tarmac route control refers to the position control of the aircraft 54 on the tarmac 51, which may include control of the aircraft 12, as well as other aircraft known in the art. Aircraft positions are monitored by the guidance system 50 inclusive of GPS via ground based antenna arrays 41 that may be in or on tarmac guide strips 55. Final precision guidance is performed via machine vision. The ground based antenna arrays 43 may be used to perform triangulation in determining aircraft position. Control of the aircraft 54 may be software customized to individualize airport requirements and configurations. The use of GPS cross runaway and tarmac route control in coordination with the guideline 52 enables rapid ground movement and control and precision gate alignment with minimal system implementation cost.

Once the aircraft 12 is staged to the terminal 14, a system based on machine vision technology orients the docking port 16 in vertical and horizontal directions. After alignment, the docking port 16 is extended and mated with the aircraft 12. Once the aircraft 12 is mated to the docking port 16 the clamshell doors 22 and 24 are opened and the aircraft 12 is serviced through the nose 20.

Figure 3:
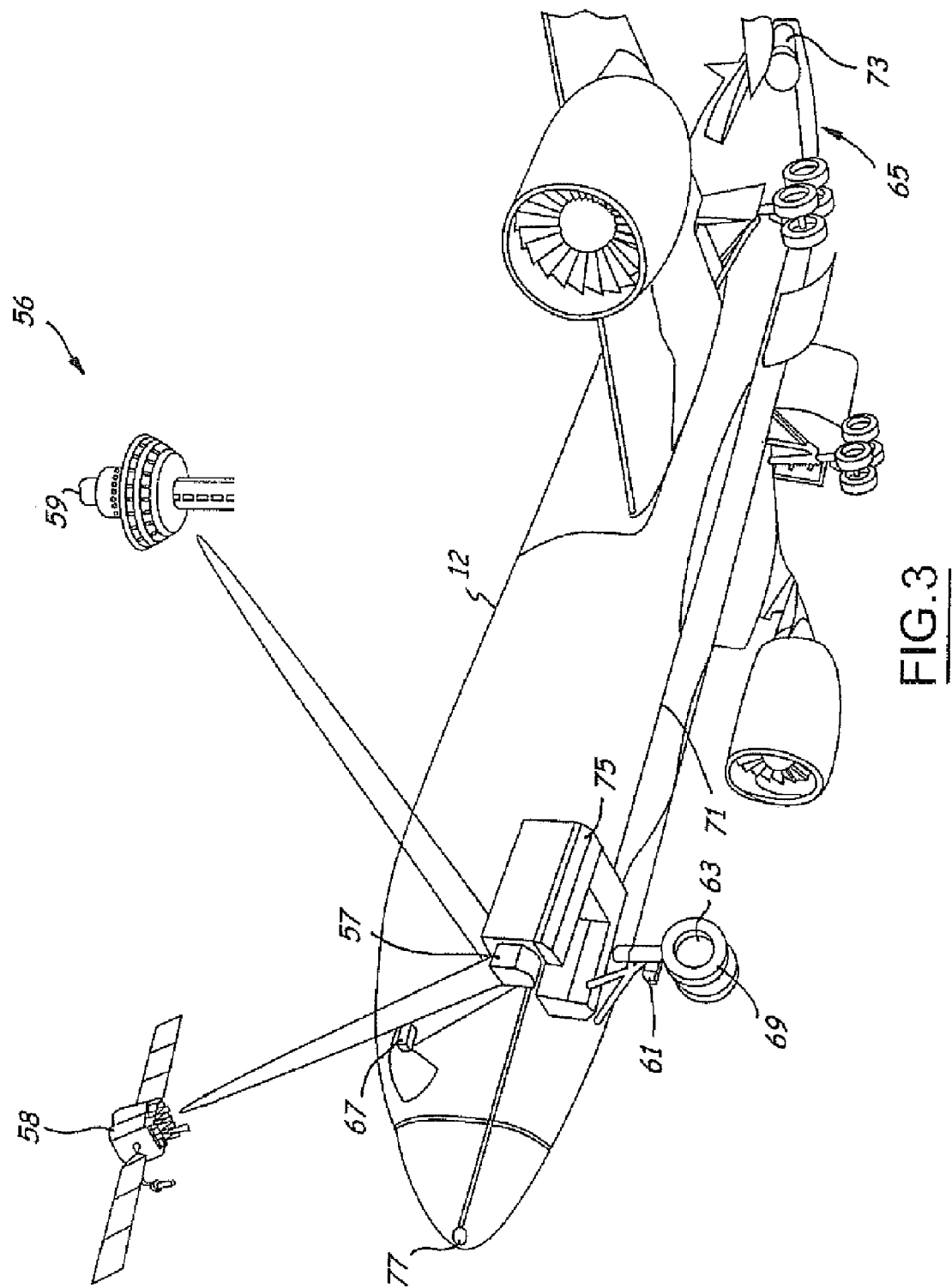
FIG. 3 is a perspective view of an aircraft guidance and mobility system in accordance with an embodiment of the present invention.

Referring now also to FIG. 3, a perspective view of an aircraft guidance and mobility system 56 in accordance with an embodiment of the present invention is shown. The guidance and mobility system 56 includes a motor drive speed and steering control panel 57 that is in communication with GPS satellites, such as satellite 58, and a radio control tower 59. The control panel 57 receives position information from the GPS satellites 58 for movement control. The control panel 57 also receives a radio control signal from the tower 59 for speed and route control to and from terminal gates. The guidance and mobility system 56 also includes an electronic and electrical control distribution bay 53, a power steering unit 61, a traction motor 63, and a power delivery system 65. The guidance and mobility system 56 may receive signals from the tower 45 for controlling the taxiing of the aircraft 12 to and from a terminal gate. This eliminates the need for wheel walkers and tail walkers, as commonly used for such taxiing.

The distribution bay 53 provides electronic control of and power to aircraft electronic systems. The control panel 57 may be part of the distribution bay 53 or separate as shown.

The power steering unit 61 is utilized to autonomously steer the aircraft 12 through use of the guidance system 56. The power steering system 61 may be overridden by a pilot of the aircraft 12 via the cockpit override 67 or by airport authority control that is external from the aircraft 12.

The traction motor 63 is a motorized wheel that may be located within the hub of the front wheels 69. The motor 63 may be an alternating current (AC) or direct current (DC) motor. The traction motor 63 is activated by the guidance system 56 to move the aircraft 12. The motor 63 may be used to decrease the traveling or taxiing speed of the aircraft 12 without the use of brakes.

The power delivery system 65 includes a supply line 71 and an auxiliary power unit 73. Power is supplied from the auxiliary power unit 73 to the distribution bay 53 via the supply line 71. The auxiliary power unit 73 may be of various types and styles known in the art.

The guidance system 56 may also include a bank of ultra capacitors 75 to supply load during peak power demands, such as when the aircraft 12 is initially moving from a rest position. This is sometimes referred to as a break away motion start. The guidance system 56 may also include a sensor 77 for close proximity guidance. The sensor 77 is coupled to the control panel 57. The sensor 77 detects objects forward of the aircraft 12, such as a terminal gate, and generates a proximity signal, which may be used by machine vision devices to accurately position the aircraft 12.

The guidance system 56 may support conventionally configured aircraft and use main engines as power mobility, while using the guidance control system 56 to guide movement of the aircraft while on the ground, and within proximity of the airport 13.

Figure 4:
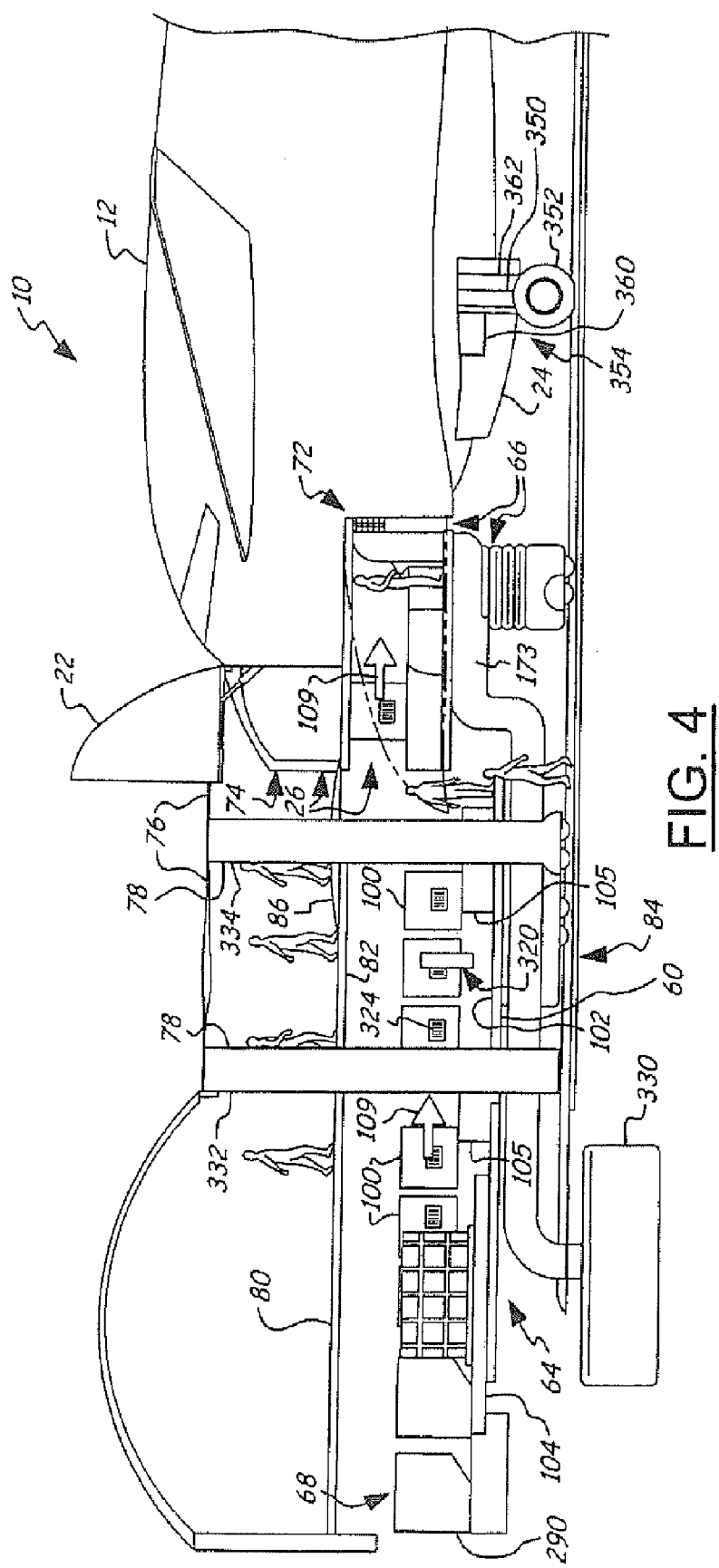
FIG. 4 is a side view of the integrated operational ground support system incorporating the use of an airport interface terminal docking port illustrated with a cargo elevator in a down state and in accordance with an embodiment of the present invention.
Figure 5:
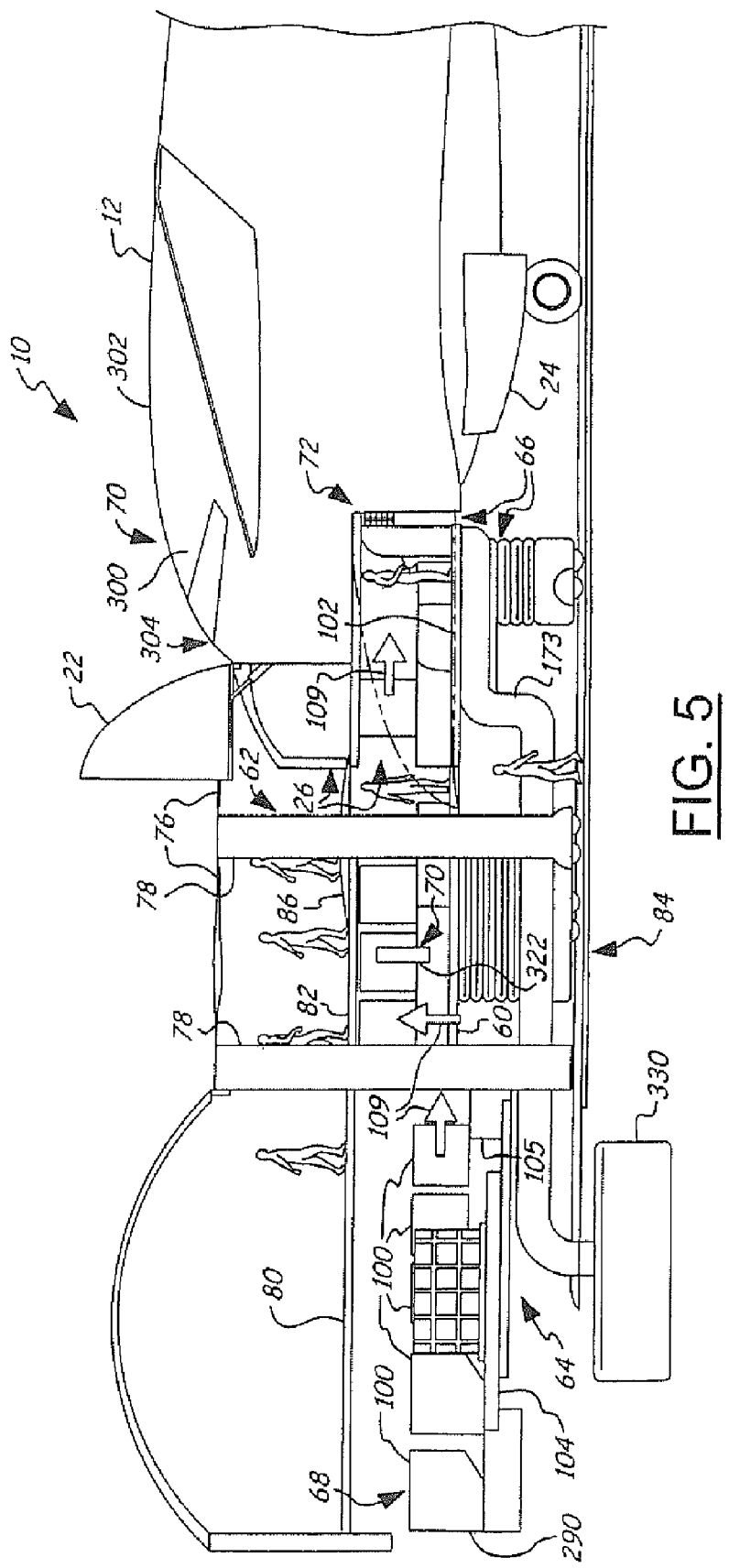
FIG. 5 is a side view of the integrated operational ground support system incorporating the use of an airport interface terminal docking port illustrated with a cargo elevator in an up state and in accordance with an embodiment of the present invention.
Figure 6:
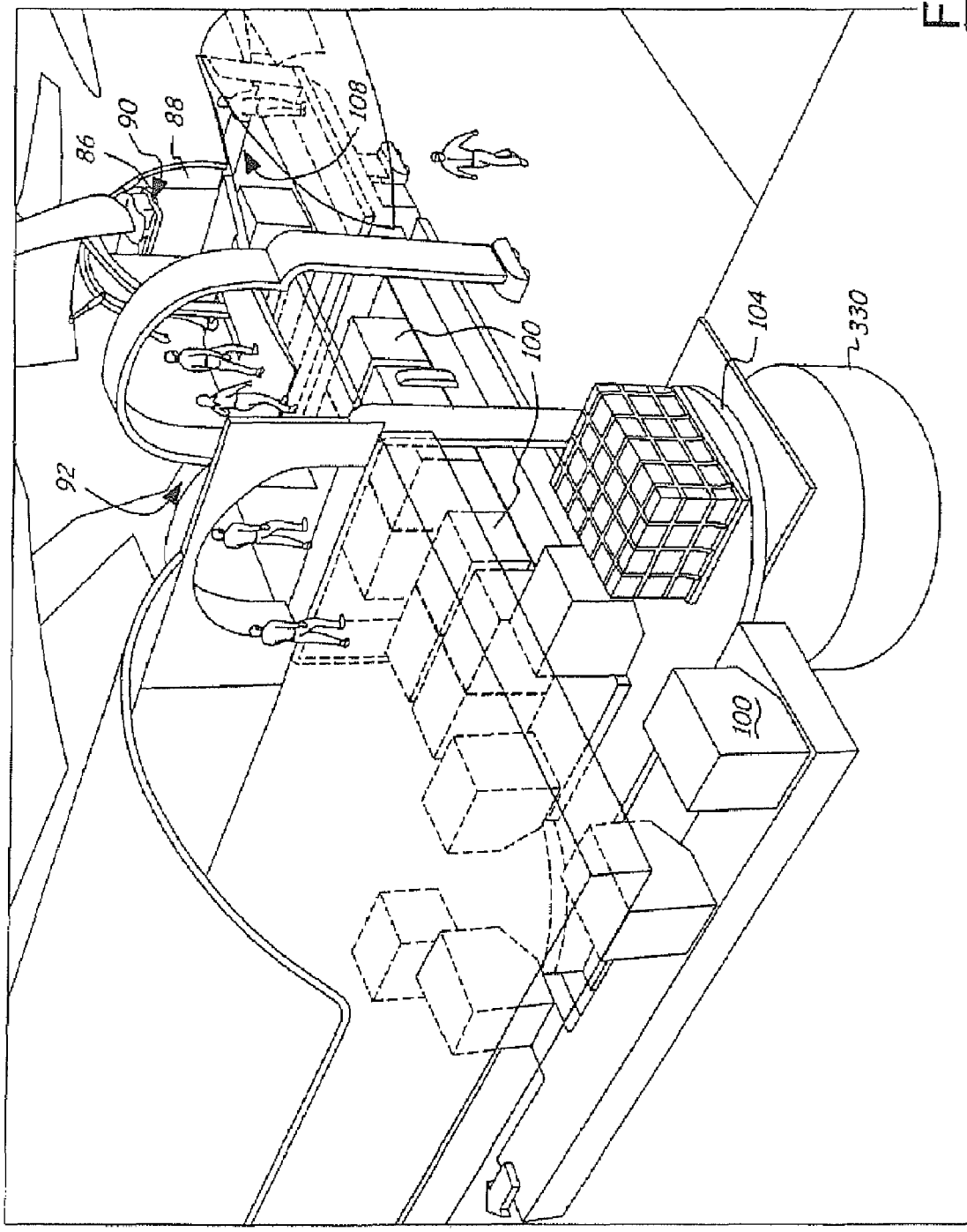
FIG. 6 is a perspective view of an integrated operational ground support system for an aircraft illustrating cargo handling in accordance with an embodiment of the present invention.

Referring now to FIGS. 4-6, side views of the integrated support system 10 are shown with a cargo elevator 60 in a "down" state and in an "up" state and a perspective view of the integrated support system 10 is shown illustrating cargo handling in accordance with an embodiment of the present invention. The integrated support system 10 includes various ground service support sub-systems, such as a passenger ingress/egress system 62, a cargo ingress/egress system 64, an aircraft primary service system 66, an aircraft secondary service system 68, a security system 70, and a health and maintenance monitoring system 72. Although only the service support sub-systems 62-72 are shown, other service-support sub-systems known in the art may be incorporated.

The passenger ingress/egress system 62 aids in the efficient ingress and egress of passengers to and from the aircraft 12. Passengers enter and exit to and from the interface terminal 14 through the terminal level portion 74 of the service opening 26. The interface terminal 14 has open glass ceilings 76 that are supported by columns 78. The passengers during the boarding process are guided through the terminal 14, on the terminal floor 80, to a terminal gate, such as gate 18. The passengers are then guided across an upper floor or terminal level 82 of the interface terminal 14 and over a coupler platform 86 to the aircraft 12.

The passengers, while being guided to and when arriving in the aircraft 12, experience the wide body interiors of both the aircraft 12 and the interface terminal 14. The passengers experience open, spacious, well lighted, and uncrowded views of the interface terminal 14 and the interior of the aircraft 12. This is best seen in FIGS. 6-9. The passengers may ingress and egress to and from the aircraft 12 in a twin column format, rather than through a narrow tunnel-loading ramp, as is the case with traditional systems. The integrated support system 10 thus provides a natural and inviting experience for the passengers.

Upon arrival of the aircraft 12, the nose 20 opens and the interface terminal 14 is mated with the service opening 26.

The sidewalls and the ceiling panels within the wide body interior 86 of the aircraft 12 remain stationary. Partitions and/or doors 88 open between the passenger compartment 90 and the interface terminal 14. The passengers are presented with the interior 86 or the wide body interior 92 of the interface terminal 14 depending upon whether the passengers are entering or exiting the aircraft 12.

The cargo ingress/egress system 64 aids in the efficient loading and unloading of cargo, service carts, and other packages, containers, and baggage known in the art. When the aircraft 12 is at the gate 18, cargo that is loaded into the cargo containers 100 may be simultaneously loaded and unloaded at the tarmac level 102 of the interface terminal 14 while passengers are entering and exiting the aircraft 12 at the terminal level 82. The cargo containers 100 during the cargo loading process are transported to the terminal interface 14 and may be rotated on a cargo carousel 104 for proper orientation into the aircraft 12. The cargo containers 100 are then conveyed across the terminal interface 14 on conveyors 105 to the cargo elevator 60. The containers 100 are raised on the elevator 60 and are conveyed into the cargo area or lower hold 108 of the aircraft 12. This process is represented by arrows 109. The elevator 60 is shown in the down state in FIG. 4 and in the up state in FIG. 5.

The cargo containers 100 may be hitched together on both side tracks or rails like rail cars and conveyed over air bearings (not shown) to and from the aircraft 12. The containers 100 are conveyed longitudinally along the length of the aircraft 12 straight into and out of the lower hold 108. This eliminates the 90° shuffle of cargo containers from a cargo loader, along the side of and perpendicularly oriented with respect to an aircraft, to cargo areas fore and aft of the cargo loader, as normally experienced with traditional systems. The aircraft 12 may also have linear drives (not shown) to transport the containers and pallets on and off the aircraft 12. Locks and guides (not shown) may be located on the port and starboard sides of the cargo hold. Side locks enable automated insertion and removal of the containers and pallets without the need of human intervention to install and remove the forward and aft restraining dogs (not shown). The rails on the sides of the bottoms of the containers and pallets may be site modified to facilitate the automated side guide rail clamping, which reduces system complexity and increases robustness of the cargo system 64, while eliminating the need for manual intervention. Side guide rail clamping significantly reduces the costs exhibited by cargo handling and minimizes aircraft structural damage incurred from ground cargo activity experienced with prior cargo systems.

Figure 7:
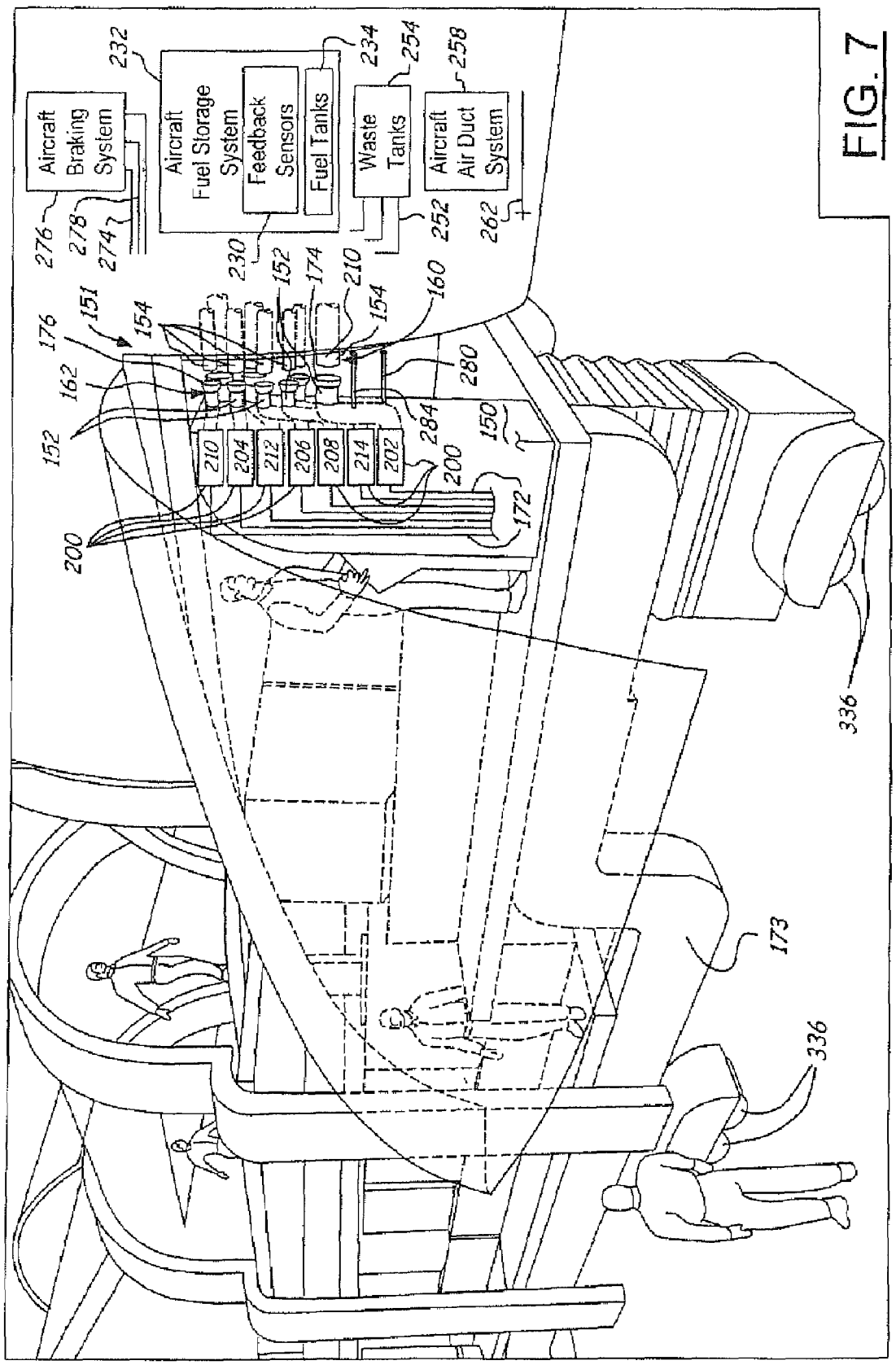
FIG. 7 is a side perspective view of the integrated operational ground support system illustrating an aircraft primary service system in accordance with an embodiment of the present invention.

Referring now also to FIG. 7, a side perspective view is shown of the integrated support system 10 illustrating the primary service system 66 in accordance with an embodiment of the present invention. The primary service system 66 includes a main control panel station 150 and multiple primary service support sub-systems 151. The main station 150 couples to the aircraft 12 via multiple primary service couplers. The primary service couplers include a first series of couplers 152 and a second series of couplers 154. The first couplers 152 are located on the main station 150. The second couplers 154 are located on the aircraft 12 and mate with the first couplers 152. The primary service sub-systems 151 include a fuel system 160, an electrical power system 162, water systems 164, air systems 166, and a brake cooling system 168, which are controlled via a station controller 170.

Each of the primary sub-systems 151 has an associated conduit 172 that extends from the interface terminal 14 through a service conduit extension 173 to the associated first coupler 152. A large separation distance exists between a fuel hydrant 174 and an electrical coupler 176 to prevent electrical arcing to fuel. Other isolation techniques known in the art may also be utilized to separate the fuel hydrant 174 from the electrical coupler 176. Fuel is delivered by the hydrant 174 rather than by fuel trucks, which minimizes deicing requirements caused by cold soaked fuel and provides a constant and desirable temperature fuel year-round.

The water systems include a potable water system, a gray water vacuum evacuation system connection, and a brown water vacuum evacuation system connection. The air systems connections include an air conditioning system connector and an engine start air system connection.

The fuel system 160, the water systems connections, the air systems connections, and the brake cooling system air supply have associated pumps, specifically a fuel pump, a potable water pump, a gray water vacuum pump, a brown water vacuum evacuation pump, an air start pump 210, an air conditioning pump 212, and a brake coolant pump 214. The pumps 200 may be located within the main station 150 or may be located elsewhere in the interface terminal 14 or at some other central location whereby multiple interface terminals may share and have access thereto.

The aircraft 12 is refueled through the high-pressure fuel hydrant 174 that extends to and couples with fueling ports on each side of the aircraft 12 when dual main stations are utilized. Machine vision ensures that the couplers 154 align in their proper orientation while redundant sensors ensure that fuel does not begin to flow until coupling is complete. The sensors may be in the form of contact limit sensors, which are activated when the clamping mechanism is fully actuated. The sensors may be backed up by continuity sensors, which indicate when the clamping mechanism is in a fully clamped position. Feedback sensors 230 from the aircraft fuel storage system 232 indicate when fueling is complete and the fuel tanks 234 are properly filled. Relief valves and anti-flow back devices may be used to ensure that any system malfunction does not result in spillage. The anti-flow back devices may be located at the level or point of entry into the fuel tanks 234 to prevent fuel from being retained in the lower level plumbing or lines (not shown) between the couplers 154 and the fuel tanks of the aircraft. The lower level lines may then be gas inerted after filling is complete.

The fuel hydrant 174 may be double walled and include an inner tube with an outer jacket. Fuel is supplied through the inner tube. The outer jacket is used to capture vapor and also serve as a relief flow back system. The feedback sensors 230 are connected to the fueling system 232. The fuel supply architecture of the interface terminal 14 provides for underground fuel storage.

Electrical power and potable water couplers are mated similar to that of the fuel couplers 174 and 210. The vacuum couplers connect to the holding tank dump tubes 252. The waste tanks 254 may then be vacuumed empty. The air conditioning coupler connects to the aircraft air duct system 258. The engine start air coupler connects to the aircraft engine start air lines. The air couplers may be supplied with air from a central shared terminal resource system, which may be shared by any number of interface terminals. The brake coolant coupler is connected to the cooling lines 274 of the aircraft braking system 276. When dynamic field brakes are utilized heat dissipation within the braking system 276 may be accommodated through other techniques known in the art rather than through the use of the brake coolant 278.

The main station 150, via the station controller 150, adjusts the amount of fluids, air, and electrical power supplied to and pumped from the aircraft 12. A control panel operator may monitor the main station 150 and shut down any of the sub-systems 151 that are operating inappropriately or the main controller 150 may in and of itself shut down one or more of the sub-systems 151. Although a single main station is shown for a single side of the aircraft 12, any number of main stations may be utilized. The main controller 150 may be microprocessor based, such as a computer having a central processing unit, have memory (RAM and/or ROM), and associated input and output buses. The main controller 150 may be an application-specific integrated circuit or be formed of other logic devices known in the art.

The main station 150 also includes a static contact neutralizing connection 280 that connects with the aircraft 12 before connection by the other couplers 152 and 154. The neutralizing connection 280 eliminates any static charge that may exist between the aircraft 12 and the interface terminal 14.

A down-load/up-load interface coupler 284 for system health and maintenance monitoring and control is also provided in the main station 150. The down-load/up-load interface coupler 284 is coupled to and is used for offboard monitoring, checking, and adjusting of aircraft onboard electric systems and controls.

The aircraft secondary service system 68 aids in the efficient servicing of the cabins, galleys, lavatories, and waste or trash containers of the aircraft 12. Although the secondary service system 68 is shown as being an integral part of the cargo ingress/egress system 64, it may be separated therefrom, as is shown with respect to the embodiment of FIGS. 11A-12. The secondary service system 68 utilizes the elevator 60, the cargo carousel 104, and the conveyors 105 to transport service carts and waste containers, such as galley carts 290, to and from the aircraft 12. The secondary service system 68 and the primary service system 66 may be operated using machine vision and automation technologies.

After cargo containers 100 are removed from the aircraft 12 the lower hold 108 is open to support cabin services. Cabin-cleaning attendants enter at the terminal level 82 to service the passenger cabins, lavatories, and galleys of the aircraft 12. Used galley carts 290 and refuses from the cabins and lavatories may be lowered within the aircraft 12 to the lower hold 108 before being conveyed off the aircraft 12. When the aircraft 12 is continuing through and is not fully serviced at the interface terminal 14, and only the front cargo containers are removed, then the services may be performed through forward galley elevator accommodations (not shown).

The galley carts 290 may be brought in and elevated into position from the lower hold 108 in the reverse order than they are used for cabin cleaning. The galley carts 290 may be stacked, which reduces the amount of space utilized thereby and allows for increased space for passenger seating, as well as shortened aircraft turn around times.

The secondary system 68 may include galley trash compactors (not shown) that are approximately the same physical size as the galley carts 290. Due to their size, the trash compactors may be removed, rotated, and replaced with and in a similar manner as that of the galley carts 290.

The security system 70 has two parts. The first part is passive and the second part is active. The first part is directed to the architecture and design of the integrated support system 10. The integrated support system 10 is designed such that passengers and cargo are passed through a single opening, specifically the service opening 26, and the flight crew is separated from the terminal level 82 and passengers thereon including passenger cabins and compartments. The use of a single opening for aircraft servicing allows for security monitoring of both passengers and cargo to be performed at a single location. The flight crew is located in a separated and elevated flight crew deck area or cabin 300 within a hump 302 of the fore part 304 of the aircraft 12. The hump 302 not only provides increased security for the flight crew, but also allows crew pre-flight checks during unload/load sequences, shortens aircraft turn around time, and decreases length of the aircraft 12 for equivalent aircraft capacity.

The second part includes a barcode screening system 320, which is used to monitor the cargo containers 100 entering and exiting the aircraft 12. A bar code reader 322 is mounted at the tarmac level and reads barcodes 324 on the cargo containers 100. Improper bar codes may be detected at the main station and the associated cargo containers may be removed from the interface terminal 14 and checked.

The health and maintenance monitoring system 72 aids in the offboard monitoring and checking of aircraft systems. The health monitoring system 72 facilitates the exchange of data between ground maintenance and support and the aircraft 12. This allows for the evolution of real time structural and aircraft system monitoring and maintenance. Structural stress cycles and intensity may be tracked. The health monitoring system 72 allows fleet maintenance to predict when maintenance is needed and perform the appropriate maintenance ahead of schedule rather than to react to a malfunction and cause undesired downtime to perform the needed maintenance and component replacement. The health monitoring system 72 includes the down-load/up-load interface coupler 284 and other electronics and electrical control and monitoring devices, such as gauges, switches, video screens, audio devices, and other controls and monitoring tools known in the art. These controls and monitoring tools may be located within the main station 150, elsewhere in the interface terminal 14, or offboard the interface terminal 14 at a central monitoring station. The health monitoring system 72 reduces inspection costs while providing a broader margin of safety.

The interface terminal 14 is extendable to the aircraft 12 and as such the service conduits are also extendable via the service conduit extension and the take-up reels 330. The interface terminal 14, as shown, includes a first support column 332 and a second support column 334. The first support column 332 is stationary and the second support column 334 is mobile. The second support column 334 and the main station 150 are on wheels 336 and may be extended away from the gate towards the aircraft 12. The main station 150 may control extension of the interface terminal 14. The service conduit extension 173 may be telescoping and be extended to or retracted from the aircraft 12.

The aircraft 12 may include one or more motor wheel assemblies 350 with motor wheels 352 for tarmac movement and mobility. The motor wheel assembly 350 can be incorporated into the front trucks of the aircraft 12. Incorporation of motor wheel assembly 350 economically facilitates ground mobility requirements of the aircraft 12. The motor wheel assembly 350 may be used in replacement of or in combination with engine thrust and towing trucks. The use of the motor wheel assembly 350 minimizes human error and increases safety and integrity of an aircraft 12.

The motor wheel assembly 350 is of the traction motor type and can be either designed as an AC or DC unit. Modern traction motors are capable of producing large torque to weight ratios. The motor wheels 352 may be located and mounted on the front steerable wheel assembly 354 of the aircraft 12. The motor wheels 352 may be spun up prior to touch down of the aircraft 12 on a landing strip or runway and reduce tire wear and increase control during a breaking sequence on a slick runway.

The motor wheel assembly 350 may be staged over the guide-strip 52 by the GPS system 42 and thus allows the guide strip 52 and the ground based radio antennae arrays to precisely guide the aircraft 12 over a prescribed directed and controlled route to and from the interface terminal 14. The motor wheel assembly 350 may be controlled by a centralized computer ground control system, such as within the central resource system, of an airport to assure proper separation of ground traffic and significantly enhance the efficiency, safety and speed of ground mobility. The motor wheel assembly 350 may be used instead of aircraft primary engines, when taxiing on the tarmac, which reduces fuel consumption. The use of the motor wheel assembly 350 also eliminates the need for ground personnel to guide the aircraft 12.

The aircraft 12 may also include a dynamic braking assembly 360. Direct current (DC) electric power supplied to drive the wheels 352 may be controlled to reduce the speed of the aircraft 12. The electrical fields of wheel motors 362 perform as a generator when being externally driven, such as during landing. The electrical fields of the wheel motors 362 are positively crossed to generate a large amount of electromagnetic field energy. Dynamic braking can supply adequate energy to charge ultra-capacitors, which can hold that energy in reserve to be available on demand. The stored energy may be used as breakaway starting energy when aircraft motion is initiated under motor wheel power.

Figure 8:
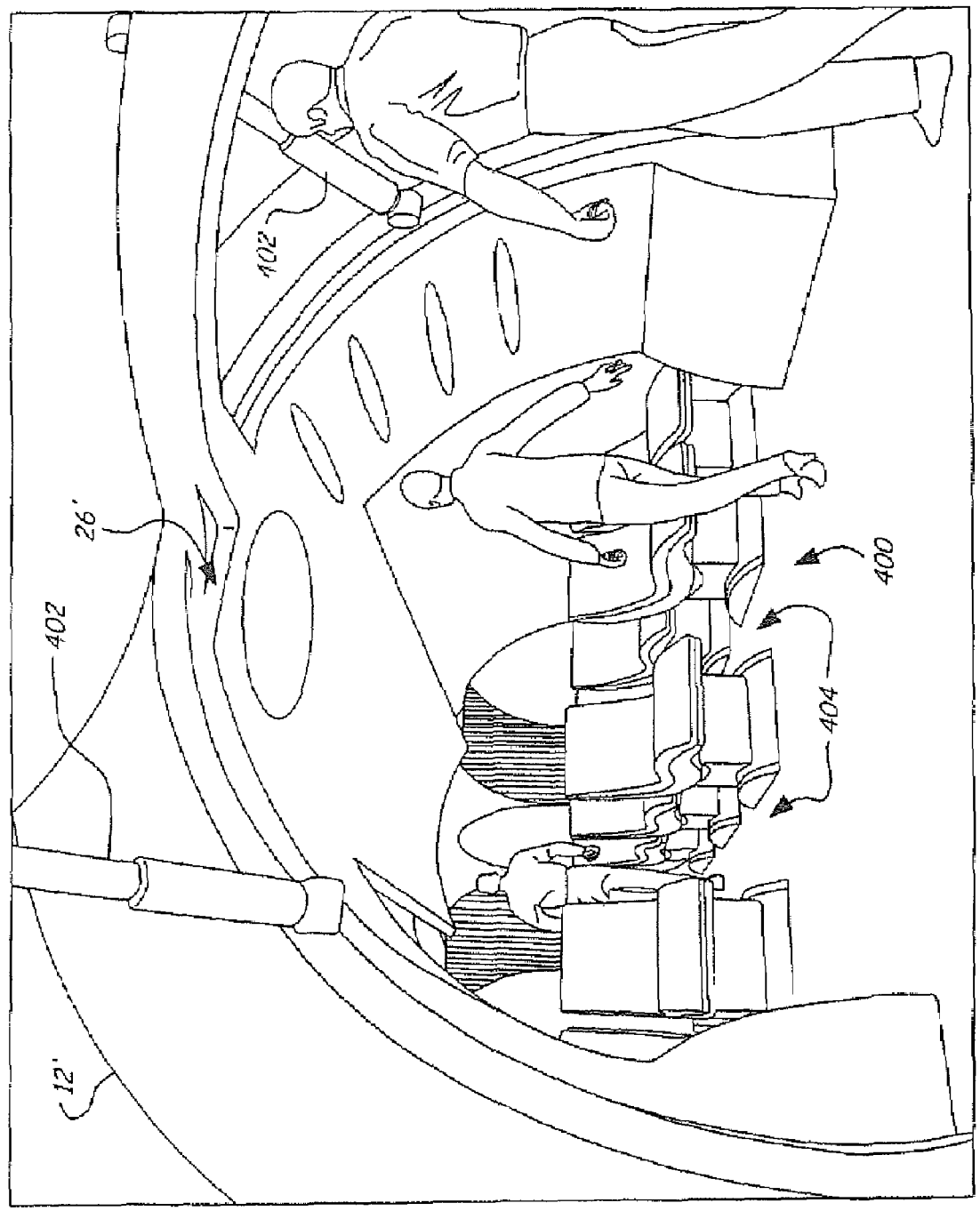
FIG. 8 is a front perspective view of a passenger compartment portion of a nose service opening of the aircraft in accordance with an embodiment of the present invention.

Referring now to FIG. 8, a front perspective view of a passenger compartment or cabin portion 400 of a nose service opening 26' of an aircraft 12' in accordance with an embodiment of the present invention is shown. The wide-open interior of the passenger cabin 400 can be viewed from the service opening 26'. A pair of hydraulic lifts 402 is shown for the opening of the upper cap (not shown, but similar to upper cap 22). Passengers may enter the aircraft 12' and proceed in columns down aisles 404. Although an aircraft is shown having a twin aisle configuration, a similar configuration may be utilized for a single aisle aircraft.

Figure 9:
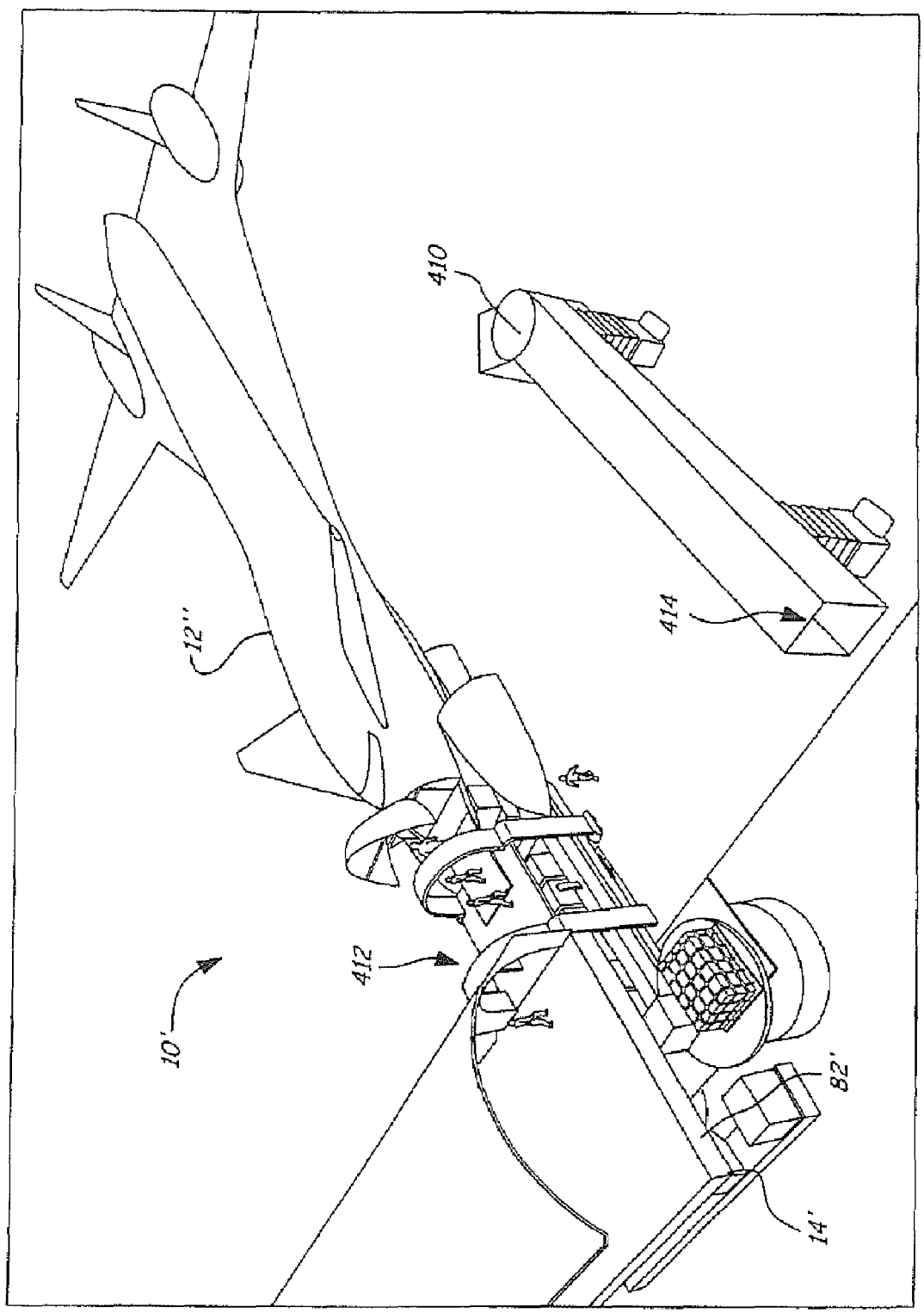
FIG. 9 is a perspective view of an integrated operational ground support system for an aircraft incorporating the use airport interface terminals for both a nose opening aircraft and a non-nose opening aircraft in accordance with an embodiment of the present invention.

Referring now to FIG. 9, a perspective view of an integrated operational ground support system 10' for an aircraft 12" is shown that incorporates the use of an airport interface terminal 14' that provides for servicing of both nose opening aircraft, such as aircraft 12", and non-nose opening aircraft (not shown) in accordance with an embodiment of the present invention. The integrated support system 10' includes the interface terminal 14' that is similar to the interface terminal 14, but further includes a traditional style jetway 410. The interface terminal 14' has a first gate 412 associated with the aircraft 12" and a second gate 414 that is associated with the jetway 410. Passengers may ingress and egress from nose opening aircraft and non-nose opening aircraft over the terminal level 82' of the interface terminal 14'.

Figure 10:
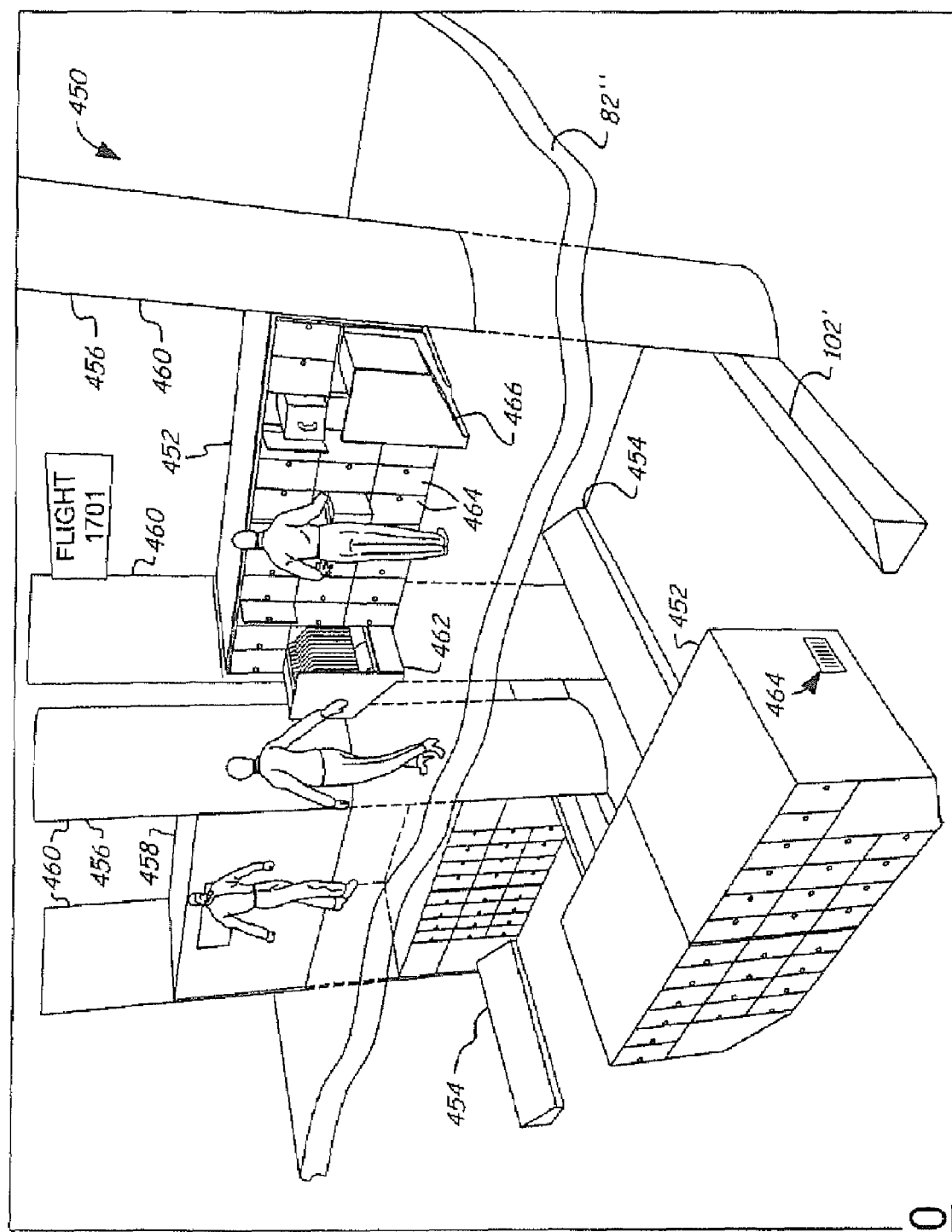
FIG. 10 is a perspective view of a terminal carry-on system in accordance with another embodiment of the present invention.

Referring now to FIG. 10, a perspective view of a terminal carry-on system 450 in accordance with another embodiment of the present invention is shown. The terminal carry-on system 450 includes carry-on modules 452, which are loaded by passengers within an interface terminal, such as the interface terminals 14 and 14'. The carry-on modules 452 are then conveyed via carry-on module conveyors 454 into an aircraft. The carry-on modules 452 are raised and lowered from the terminal level 82" via elevators 456. The carry-on modules 452 may also be conveyed, similar to the cargo containers 100 above, into the lower hold and through a nose service opening of an aircraft, such as service opening 26. The carry-on modules 452 may be replaced with false partitions 458 (only one is shown) to prevent passengers from entering areas between elevator columns 460 when the carry-on modules 452 are in transit.

The carry-on modules 452 may be designed to provide both cloak closets 462, carry-on cubbyhole lockers 464, as well as other carry-on containers or compartments known in the art, such as the compartment 466. The carry-on modules 462 may be loaded into a forward area of a cargo hold using a last on first off method.

The carry-on modules 452 may have bar codes 464, as shown. The bar-codes 464 may be checked by a security system, such as the security system 70, while in transport to an aircraft.

After passengers have cleared security and have arrived at their gate of embarkation, they may place cloaks and carry-on luggage into the carry-on modules 452 at the gate. Upon filling of the carry-on modules 452, the carry-on modules 452 are then lowered down to the tarmac level 102' and directly conveyed into the appropriate aircraft. This process alleviates apprehensions passengers may have that are directed to becoming separated from their luggage, since they are able to load it themselves. In using the carry-on system 450, passengers need not compete with other fellow passengers for carry-on space within an aircraft. The carry-on system 450 also decreases boarding and dis-boarding times.

Referring now to FIGS. 11A and 11B, a side view and a perspective view of an integrated operational ground support system 10''' incorporating the use of an aircraft passenger/cargo loader-unloader 470 in accordance with another embodiment of the present invention is shown. The passenger/cargo loader-unloader 470 is mobile and may be used in replacement of an interface terminal. The passenger/cargo loader-unloader 470 also includes a terminal level 472 and a tarmac level 474. The terminal level 472 is used as a passenger servicing floor and the tarmac level 474 is used as a cargo transport floor. Passengers may enter the passenger/cargo loader-unloader 470 in the rear 476 at a terminal gate and exit in the front 478 through the service opening 26" of the aircraft 12'''. Cargo may enter in the rear 476 over a cargo gate/ramp 480 onto a cargo platform 482 and conveyed across the cargo platform 482 onto a hydraulic lift platform 484, which raises the cargo to the cargo hold level 486 of the aircraft 12''', via a main station 150'. Once raised the cargo may then be conveyed into the aircraft 12'''.

The passenger/cargo loader-unloader 470 is useful when it is necessary to load and unload passengers and cargo from an aircraft on a tarmac due to capacity limitations at terminals within an airport. The passenger/cargo loader-unloader 470 also allows for simultaneous ingress and egress of passengers and cargo from the aircraft 12''', similar to that of the interface terminals 14 and 14'.

Although the loader/unloader 470 is shown as being utilized in conjunction with and mating to a nose of an aircraft, the loader/unloader 470 may be easily modified to mate to port or starboard sides of an aircraft. For example, the loader/unloader 470 may be used to service the aircrafts illustrated in FIGS. 14-16. The loader/unloader 470 may mate with service openings in the lower lobe regions forward of the wings on the port and starboard sides of the aircraft.

Referring now to FIG. 12, a perspective view of an integrated operational ground support system 10'''' incorporating the use of a portable ground-servicing unit 490 in accordance with another embodiment of the present invention is shown. The ground-servicing unit 490 may also be considered as an aircraft loader/unloader. The ground-servicing unit 490 is also mobile and may be used in replacement of an interface terminal. The ground-servicing unit 490 also includes a terminal level 492 and a tarmac level 494. The terminal 492 is used as a primary service floor and the tarmac level 494 is used as a secondary service floor. Secondary aircraft services may be provided on the terminal level 492. For example, galley carts, lavatory carts, trash carts, and other service carts may be conveyed onto the terminal level 492 from the rear and conveyed into the aircraft 12'''' through the front 496 of the ground servicing unit 490. The lower portion 498 of the ground-servicing unit 490 is similar to that of an interface terminal, such as the interface terminals 14 and 14', in that it includes a main station 150'' that couples to the aircraft 12''''.

Various tanks and supply holding units 500 reside on the tarmac level 494 of the ground-servicing unit 490. The tanks and holding units 500 may be separate containers or may be part of a single segregated unit, as shown. The tanks and holding units 500 may be used to supply and extract materials, such as fuel, water, air, and coolant, as well as power to and from the aircraft 12''''. The tanks and holding units 500 may include a fuel tank, a potable water tank, a gray water tank, a brown water tank, an air start tank, an air-conditioning tank, an electrical supply holding unit, as well as other tanks and holding units known in the art. The materials may be supplied to and pumped from the aircraft 12'''' using pumps (not shown) within a pump housing 502 over lines 504. The pump housing 502 may contain pumps similar to pumps 202-214 above.

Referring now to FIG. 13, a perspective view of a an integrated operational ground support system $10^V$ incorporating the use of passenger transport modules 520 in accordance with still another embodiment of the present invention is shown. The integrated support system $10^V$ includes an interface terminal 522 configured to shuttle the passenger modules 520 to and from an aircraft $12^V$. The passenger modules 520 are shuttled over a railway type system 524 to the aircraft $12^V$. Passengers may pre-board the passenger modules 520 into their respective assigned seats at a gate 526 and then be shuttled into the aircraft $12^V$. The assigned seats within the passenger modules 520 are the same assigned seats used on the aircraft $12^V$. Once the modules 520 are positioned within the aircraft $12^V$ they are locked into place. This increases efficiency in the loading of passengers and carry-ons into segmented portions of an aircraft.

The passenger modules 520 are similar in shape and have a similar interior as that of an aircraft. The passenger modules 520 may include over head compartments, comfort and convenience features, such as air-conditioning controls, crewmember call buttons, head set jacks, lavatories, and other comfort and convenience features known in the art. Although the passenger modules 520 are shown as being loading into a side 530 of the aircraft $12^V$, they may be loaded into the front 532 of the aircraft $12^V$ through a service opening, such as opening 26.

The interface terminal 522 also includes the cargo-loading portion of the integrated support system (of FIGS. 4-7), represented by numerical designator 540. Cargo is simultaneously loaded through the nose 20' of the aircraft $12^V$. Once the passenger modules 520 and cargo are loaded the nose 20' closes and the aircraft $12^V$ departs from the interface terminal 522. The process is reversed when the aircraft $12^V$ arrives at its destination.

The above-described aircraft is also easily converted from a passenger aircraft to a freighter aircraft. Traditional aircraft are configured such that the interior passenger payloads, seats, lavatories, galleys, stow bins, etc., must be broken down into pieces and removed through the passenger entry door in order to convert from a passenger aircraft to a freighter aircraft. With a front loader configuration or an aircraft that allows loading and unloading through the nose, the passenger payloads can be installed as pre-built modules during assembly of the aircraft and later removed for rapid freighter conversion straight through the nose of the aircraft. System connections may be designed for quick connect and release. Cargo floors and liners may be designed for rapid installation and removal. This also facilitates rapid refurbishment when desired and rapid livery changes when ownership of the aircraft is changed.

Nearly all passenger airliners are converted into freight airlines. Through the nose servicing increases value of the aircraft for after market use by significantly lowering the cost of conversion. Reduced cost of conversion reduces the cost of ownership by raising the residual value of the aircraft.

Referring now to FIG. 14, a perspective view of an integrated operational ground support system 600 for an aircraft 602 in accordance with another embodiment of the present invention is shown. The ground support system 600 includes a passenger servicing bridge 604 and a multi-level cabin and cargo servicing bridge 606 that is separate and isolated from the passenger servicing bridge 604. The servicing bridges 604 and 606 may have any number of auxiliary access doors 605.

The passenger servicing bridge 604 includes a passenger main bridge section 608 and one or more flex extensions 610. Passengers ingress and egress from the aircraft 602 within the passenger main section 608 through the nose 612 of the aircraft 602.

The cabin and cargo servicing bridge 606 includes an upper level or terminal level 620 and a lower level or cargo level 622. Ingress and egress of service carts 624 and cabin cleaning crewmembers is performed on the terminal level 620 through the upper service openings 626 of the aircraft 602. Ingress and egress of cargo 628 is performed on the cargo level 622. The cargo 628 is loaded in and unloaded from the aircraft 602 via conveyors 630, including a ramp conveyor 632 and a linear drive cargo lift 634 through the lower service opening 636.

The terminal level 620 includes a cabin main bridge section 638 with a flex extension 639 and a pair of lateral bridge sections 640, each of which having flex extensions 642. The cargo level 622 includes a cargo main bridge section 644 also with a flex extension 646. Another flex extension 648 may also be utilized between a multi level rotunda 650 and the cabin and cargo servicing bridge 606. The terminal level 620 is coupled to the cargo level 622 via bridge lifts 652 for adjusting vertical position of the terminal level 620.

Various rotundas may exist between the terminal 660 and the bridges 604 and 606 and as part of the bridges 604 and 606, such as the rotunda 662, to allow the bridges 604 and 606 to rotate to and away from the aircraft 602. Motion of the flex extensions 642 and the rotundas 650 and 662 is illustrated in FIG. 16.

Referring now to FIGS. 15 and 16, a perspective view of an integrated operational ground support system 670 for an aircraft 672 and a perspective view illustrating servicing bridge pivot motion thereof are shown in accordance with yet another embodiment of the present invention. The ground support system 670 includes a passenger servicing bridge 674 and a cabin and cargo servicing bridge 606', which is similar to the cabin and cargo servicing bridge 606. The passenger servicing bridge 674 couples to the port side of the aircraft 672 to allow passenger ingress and egress therethrough.

The passenger servicing bridge 674 includes a passenger main bridge section 680 with a flex extension 682 and a pair of bridgeheads 684, each with a pair of flex extensions 686. Passengers may ingress and egress within and along the main section 680 into a port side of the aircraft 672 via the bridgeheads 684. The bridgeheads 684 include a first fore bridgehead 688 and a first aft bridgehead 690. Flex extensions 682 and 692 allow the bridgeheads 684 to be articulated in fore and aft directions along the aircraft 672 for proper alignment with aircraft doors.

The passenger servicing bridge 674 and the cabin and cargo servicing bridge 606' may be on wheels 694 and rotated to and away from the aircraft 672, as is depicted by arrows 696. The linear drive cargo lift 634' may be coupled to the cabin and cargo servicing bridge 606' and be rotated away from the aircraft 672 simultaneously with the cabin and cargo servicing bridge 606'.

With conventional aircraft, services may be supplied with service docking couplers that engage with the aircraft from the lower lobe regions on the port and starboard sides forward of the wings. Cargo loading and unloading may also be automated.

Referring now to FIG. 17, a perspective view of a tarmac interface service system 700 in accordance with an embodiment of the present invention is shown. The tarmac service system 700 extends out from the tarmac 702 and couples to the aircraft 704. The tarmac service system 700 may couple to the aircraft 704 in various locations. The tarmac service system 700 provides primary services to the aircraft 704. Conduit 706 is coupled to the aircraft 704, as shown, and fuel, air, electrical power, water, and coolant may be supplied to the aircraft 704. Fluids, such as potable water system and gray water may be removed from the aircraft 704 or be refurbished.

Referring now to FIG. 18, a perspective view of a fuel hydrant supply system 720 in accordance with yet another embodiment of the present invention is shown. The fuel hydrant supply system 720, as shown, is a four-point hydrant system, which includes two pair of hydrants 722 that extend from the tarmac 724 and couple to the aircraft 726. Each of the hydrants 722 may also have an inner supply tube and an outer jacket 728 for pulling fumes away from the aircraft 726. The hydrants 722 may be coupled on a side of the aircraft 726 inboard of a wing to body joint 730, as shown, or may be couple to other locations on the aircraft 726.

Referring now to FIG. 19, a perspective view of a linear drive cargo lift 634" in accordance with yet another embodiment of the present invention is shown. The linear drive cargo lift 634" includes a base 740 with a flex extension 742 oriented to provide lift to a conveyor table 744. Objects are transported on the conveyor table 744 from the cabin and cargo servicing bridge 746 to the cargo hold 748 of the aircraft 750.

Referring now to FIG. 20, a perspective view of a machine vision alignment system 750 in accordance with another embodiment of the present invention is shown. The alignment system 750 includes cameras 752 and alignment couplers 754. The alignment system 750 is sued by vehicle on-board systems to align cameras 752 with the couplers 754. This alignment system 750 aids in aligning the fueling ports of the aircraft 758 with the flow back and vapor collection jackets 756. The sample embodiment of FIG. 20 also illustrates the supply of brake coolant via a coolant line 760 between the tarmac 762 and the brake system 764 of the aircraft 758.

Referring now to FIG. 21, a perspective view of a passenger servicing bridge 800 having a double door jetway 802 in accordance with another embodiment of the present invention is shown. The double door jetway 802 includes a first class corridor 804 and a second class or general class corridor 806. The first class corridor 804 is separated from the second class corridor 806 by a center wall 808. First class passengers ingress and egress the aircraft 810 via the first class corridor 804 and through a first bridgehead 812. Other passengers ingress and egress the aircraft 810 through the second corridor 806 and a second bridgehead 814. The corridors 804 and 806 although shown for ingress and egress of passengers, may be utilized for other aircraft services.

Referring now to FIGS. 22A-C, a perspective view of a ground support system 830 incorporating a cargo carousel or more specifically a 90° adjustable feed direction platform 832 and perspective views of the feed platform 832 are shown in accordance with another embodiment of the present invention. The feed platform 832 includes cargo guides/bumpers 834 for the guidance of cargo 836 on and off the feed platform 832. The feed platform 832 includes a rotating belt 838, which coveys or transfers the cargo 836 between cargo loaders or handlers 840. The convey direction of the feed platform 832 may be adjusted by rotating the feed platform 832 on swivel 842. For example, to switch the convey direction, in the example embodiment shown, the feed platform 832 may be lifted and rotated 90°, as represented by arrows 844 in FIG. 22B. Loading is represented by arrows 846 in FIG. 22A and off-loading is represented by arrows 848 in FIG. 22C.

Referring now to FIG. 23, a perspective view of a fuel hydrant supply and brake cooling system 850 incorporating a drainage system 852 in accordance with another embodiment of the present invention is shown. The fuel supply and brake system 850 includes a machine vision alignment system 854 similar to the alignment system 750 with cameras 856 and alignment couplers 858. The fuel supply and brake system 850 also includes fueling ports with flow back and vapor collection jackets 860 and spill traps 862. Any liquid or fuel spillage on the tarmac near the flow back and vapor collection jackets 860 drains through the spill traps 862 underground into an undertarmac level 864 and is isolated from the aircraft 866. A fuel line 868 is coupled to the flow back and vapor collection jackets 860 and to a fuel control valve 870, which is used to adjust the flow of fuel to the aircraft 866. A fluid drain pipe 871 resides in the undertarmac level 864 and allows for drainage of fluids residing therein.

In addition, tarmac brake coolant vents 872 are provided to allow for cooling air to be emitted from the tarmac 874 and directed at the brakes (not shown) of the aircraft 866. The vents 872 serve as an air vent and as a spill trap. Ambient air may flow through the vents 872. Any fluids leaking from the aircraft 866 near the brakes drains through the vent 872, is collected into a holding reservoir 876, and eventually out a drainage pipe 878. An air supply pipe 880 is coupled to the holding reservoir 876 above a fluid level 882 such that the air does not flow through any fluid contained therein. Air directed at the brakes is represented by arrows 881.

Referring now to FIGS. 24A-B, an overhead perspective view of a remote baggage handling system 900 and a perspective view of a baggage "drop-off" terminal 902 are shown in accordance with another embodiment of the present invention. The remote baggage handling system 900 includes the remote baggage drop-off terminals 902 wherein passengers "check-in" their baggage and cargo before traveling and arriving at the airport terminal 904. Remote baggage "pick-up" terminals 906 are similarly located at a remote location from the airport terminal 904, as that of the drop-off terminals 902, wherein passengers may pick-up their baggage upon leaving the airport terminal 904. The drop-off terminals 902 and the pick-up terminals 906 may have associated or designated airlines, such as Delta™, Alaska™, Southwest™, Northwest™, American™, and Continental™. A baggage transfer system 908 conveys the baggages and cargo between the airport terminal 904 and the baggage terminals 902 and 906. The baggage drop-off terminal 902 and the baggage pick-up terminal 906 are remotely located such that baggages may be inspected and scanned prior to entering the airport terminal 904. This increases airport safety.

An x-ray and weapon/explosive detection equipment center 910 may be located at the baggage drop-off terminal 902 or at some other location between the baggage drop-off terminal 902 and the airport terminal 904 or in route along the baggage transfer system 908, as shown. The weapon/explosive center may scan baggage for any unpermitted objects known in the art including weapons, explosives, gas tanks, stolen objects, drugs, alcohol, and large quantities of money. When an explosive is detected in a baggage within the weapon/explosive center 910, the baggage may be transported directly to a remote detonation bunker 912 wherein it may be safely detonated and not cause harm to any passengers, animals, airport personal, or airport systems and equipment.

In operation, inboard passengers drop off their baggage at the baggage drop-off terminal 902. The baggage is scanned and inspected and then transferred, when deemed safe, to the airport terminal 904. The passengers upon dropping off their bags travel in their vehicles or via shuttle to the airport terminal 904. This is performed in reverse for outboard passenger traffic. The remote baggage handling system 900 relieves airport congestion, increases available airport terminal space, and when applied to a traditional airport terminal is a non-intrusive modification.

The present invention provides integrates ground support systems that provide shortened gate turn around times and are convenient and efficient for both the airlines and flying public. The nose servicing aspects of the present invention allow for increased space capacity within an aircraft for an increased number of seats and cargo space. The nose servicing aspects also eliminate the need for side passenger ingress and egress doors and side cargo ingress and egress doors. Side passenger doors may be replaced with escape hatches. The reduced number of side doors also minimizes aircraft corrosion from water intrusion in doorways. The nose servicing aspects also minimize aircraft cargo handling systems.

The architecture of the integrated system provides shortened gate turn around cycles, reduced ground support personnel, reduced ground support equipment, and reduced risk of damage to an aircraft through ground support activities.

Through use of the present invention, the ground support working environment is significantly improved. Ground support personnel are able to service an aircraft within an enclosed environmentally controlled working environment with minimal fumes. Safety is improved and traditional sources of long-term physical aircraft damage are minimized. The ground support personnel are segregated from tarmac noise and environmental elements.

The present invention also improves airport runway capacity and airport throughput. The present invention also minimizes ground support equipment needed for servicing of an aircraft.

In addition, the present invention may be utilized to support traditional side ingress and egress aircraft. The present invention allows for the transfer of luggage, cargo, pallets, and containers from a terminal or staging area to directly to an aircraft using linear drives. The luggage, cargo, pallets, and containers may be radio frequency tagged to include information, such as ownership, weight, center of gravity, and other related information, which aids in loading and unloading thereof.

The above-described apparatus and method, to one skilled in the art, is capable of being adapted for various applications and systems including: aeronautical systems, land-based vehicle systems, or other applications or systems known in the art that require servicing of a vehicle. The above-described invention can also be varied without deviating from the true scope of the invention.

What is claimed is:

1. An integrated operational ground mobility and support system comprising:
at least one aircraft, at least one of said at least one aircraft having at least one service opening on at least one side of said at least one aircraft;
an airport terminal having at least one airport interface terminal docking port;
the at least one airport interface terminal docking port having at least one ground support service sub-system, mating with said at least one aircraft at said at least one service opening, and comprising a plurality of servicing levels; and
a remote baggage handling system that is remotely located from and transfers baggage to and from said airport terminal,
said at least one ground support service sub-system providing a plurality of services, at least one of which being a non-cargo service, through one of said at least one service opening and on said plurality of levels.

2. A ground support system as in claim 1 wherein said remote baggage handling system scans said baggage for at least one of weapons, explosives, and unpermitted objects.

3. A ground support system as in claim 1 wherein said at least one aircraft comprises a flight deck area that is isolated from said at least one service opening.

4. A ground support system as in claim 3 wherein said flight deck area is elevated from a passenger compartment of said at least one aircraft.

5. A ground support system as in claim 1 wherein said at least one ground support service sub-system is selected from at least one of a passenger ingress/egress system, a cargo ingress/egress system, an aircraft primary service system, an aircraft secondary service system, a security system, and a health and maintenance monitoring system.

6. A ground support system as in claim 1 wherein said at least one aircraft and said at least one airport interface terminal docking port comprise a floor for passenger ingress and egress.

7. A ground support system as in claim 1 wherein said at least one aircraft and said at least one airport interface terminal docking port comprise a floor for cargo ingress and egress.

8. A ground support system as in claim 1 wherein said at least one aircraft comprise a first plurality of primary service couplers and said at least one airport interface terminal docking port comprise a second plurality of primary service couplers that mate with said first plurality of primary service couplers.

9. A ground support system as in claim 1 wherein said at least one airport docking port comprises a cargo elevator platform.

10. A ground support system as in claim 1 wherein said at least one ground support service sub-system comprises passenger transport modules.

11. A ground support system as in claim 10 wherein said at least one aircraft is configured to receive said passenger transport modules.

12. A ground support system as in claim 1 wherein said at least one airport interface terminal docking port is configured to shuttle at least one passenger transport module to and from said at least one aircraft.

13. A ground support system as in claim 1 wherein said at least one airport interface terminal docking port is configured to shuttle at least one passenger transport module to and from a side of said at least one aircraft, and cargo to and from a nose of said at least one aircraft.

14. A ground support system as in claim 1 further comprising an aircraft terminal mating system.

15. A ground support system as in claim 14 wherein said aircraft terminal mating system is in the form of a machine vision technology system.

16. A ground support system as in claim 14 wherein said aircraft terminal mating system comprises a docking coupler.

17. A ground support system as in claim 14 wherein said aircraft terminal mating system comprises a global positioning system.

18. A ground support system as in claim 14 wherein said aircraft terminal mating system comprises a precision guidance system that follows a guideline in mating the at least one aircraft to said at least one airport interface terminal docking port.

19. A ground support system as in claim 1 wherein said at least one airport interface terminal docking port comprises a terminal carry-on system.

20. A ground support system as in claim 19 wherein said terminal carry-on system comprises at least one carry-on transport module, said at least one airport interface terminal docking port shuttling said at least one carry-on transport module to and from said at least one aircraft.

21. A ground support system as in claim 20 wherein said at least one carry-on transport module is bar-coded.

22. A ground support system as in claim 1 wherein said at least one airport interface terminal docking port comprises at least one bar code reader that reads bar codes on cargo transported to and from the at least one aircraft.

23. A ground support system as in claim 1 wherein said at least airport interface terminal docking port comprises at least one cargo carousel.

24. A ground support system as in claim 23 wherein said at least one cargo carousel has a plurality of feed directions.

25. A ground support system as in claim 1 wherein said at least one airport interface terminal docking port extends to mate with said at least one aircraft.

26. A ground support system as in claim 1 wherein said plurality of service openings comprise openings selected from a nose opening, a port side opening, a starboard side opening, a terminal level opening, and a cargo level opening.

27. A ground support system as in claim 1 further comprising a fuel supply and drain system comprising:
fueling ports with flow back and vapor collecting jackets supplying fuel to said at least one aircraft; and
tarmac spill traps collecting fluids proximate said fueling ports.

28. A ground support system as in claim 1 further comprising a brake cooling and drain system comprising:
at least one vent coupled within a tarmac;
a fluid reservoir configured for containment below a tarmac, to couple said at least one vent, and to collect fluids proximate said at least one aircraft;
an air supply line directing air through said fluid reservoir and said at least one vent at said at least one aircraft; and
a fluid drain collecting fluids within said fluid reservoir.

29. An integrated operational ground mobility and support system comprising:
at least one aircraft, at least one of said at least one aircraft having a plurality of service openings on at least one side of said at least one aircraft; and
at least one airport interface terminal docking port, at least one of said at least one airport interface terminal docking port having at least one ground support service sub-system, mating with said at least one aircraft at and comprising a plurality of corridors and bridgeheads associated with said plurality of service openings;
said at least one aircraft having a passenger servicing bridge having a jetway, said jetway having at least two doorways;
said at least one ground support service sub-system providing a plurality of services simultaneously on multiple levels to said at least one aircraft through said plurality of service openings, at least one of said plurality of services being a non-cargo based service.

30. A ground support system as in claim 29 wherein said jetway includes a first class corridor and a non-first class corridor.

* * * * *